(12) United States Patent
Chen et al.

(10) Patent No.: US 12,399,851 B2
(45) Date of Patent: *Aug. 26, 2025

(54) SYSTEMS AND METHODS RELATED TO CONFIGURING DEVICES IN A MODULE

(71) Applicant: SKYWORKS SOLUTIONS, INC., Irvine, CA (US)

(72) Inventors: Andrew Raymond Chen, Newton, MA (US); Lui Lam, Lexington, MA (US); James Henry Ross, Cedar Rapids, IA (US); Bryan J. Roll, Cedar Rapids, IA (US); William Gerard Vaillancourt, Methuen, MA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,265

(22) Filed: Nov. 17, 2023

(65) Prior Publication Data

US 2024/0160590 A1 May 16, 2024

Related U.S. Application Data

(63) Continuation of application No. 17/682,954, filed on Feb. 28, 2022, now Pat. No. 11,822,368, which is a continuation of application No. 16/859,961, filed on Apr. 27, 2020, now Pat. No. 11,263,159, which is a continuation of application No. 15/338,061, filed on Oct. 28, 2016, now Pat. No. 10,635,616.

(60) Provisional application No. 62/290,906, filed on Feb. 3, 2016, provisional application No. 62/290,336, filed on Feb. 2, 2016, provisional application No. 62/247,742, filed on Oct. 28, 2015.

(51) Int. Cl.
*G06F 13/40* (2006.01)
*G06F 13/36* (2006.01)
*G06F 13/42* (2006.01)

(52) U.S. Cl.
CPC .......... *G06F 13/36* (2013.01); *G06F 13/4022* (2013.01); *G06F 13/4068* (2013.01); *G06F 13/4282* (2013.01)

(58) Field of Classification Search
None
See application file for complete search history.

(56) References Cited

U.S. PATENT DOCUMENTS

| 4,965,883 | A | 10/1990 | Kirby |
| 7,433,394 | B2 | 10/2008 | Pilgram et al. |
| 7,938,327 | B2 | 5/2011 | Liu |
| 8,423,823 | B2 | 4/2013 | Venus et al. |

(Continued)

*Primary Examiner* — Elias Mamo
(74) *Attorney, Agent, or Firm* — Chang & Hale LLP

(57) ABSTRACT

Configuration devices in a module. In some embodiments a radio-frequency module includes a serial bus including a first serial data line and a second serial data line. The radio-frequency module also includes a control component coupled to the serial bus and the first switch, the control component configured to determine whether first data is detected on the first serial data line, determine whether second data is detected on the second serial data line, and decode a command based on the first data and second data when the first data is detected on the first serial data line and when the second data is detected on the second serial data line.

20 Claims, 8 Drawing Sheets

(56) References Cited

U.S. PATENT DOCUMENTS

| | | | |
|---|---|---|---|
| 8,521,101 B1* | 8/2013 | Kadam | H04J 3/0685 |
| | | | 375/350 |
| 8,526,995 B2 | 9/2013 | Ripley et al. | |
| 9,374,043 B2* | 6/2016 | Wang | H03F 1/223 |
| 2002/0184001 A1 | 12/2002 | Yao | |
| 2006/0013051 A1 | 1/2006 | Lee | |
| 2010/0166254 A1 | 7/2010 | Lancieri | |
| 2010/0166524 A1 | 7/2010 | Crane et al. | |
| 2012/0064952 A1* | 3/2012 | Iijima | H03K 17/6221 |
| | | | 455/571 |
| 2012/0185623 A1* | 7/2012 | Ross | G06F 13/362 |
| | | | 710/63 |
| 2012/0324320 A1* | 12/2012 | Terabe | G06F 11/10 |
| | | | 375/295 |
| 2013/0198427 A1* | 8/2013 | Leitner | G06F 13/404 |
| | | | 710/110 |
| 2013/0271328 A1* | 10/2013 | Nickel | G01R 29/10 |
| | | | 343/703 |
| 2015/0056941 A1 | 2/2015 | Lin et al. | |
| 2016/0292113 A1* | 10/2016 | Zhang | G06F 1/3228 |

* cited by examiner

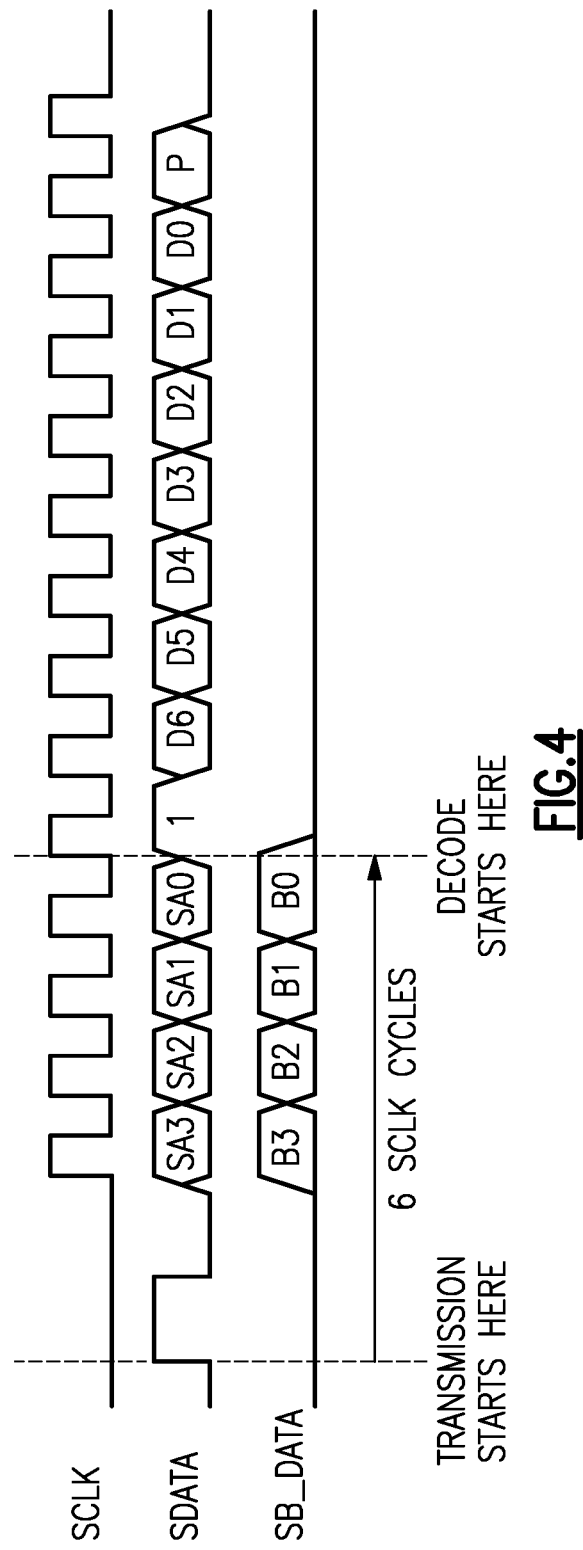
FIG.3
FIG.4

SYSTEMS AND METHODS RELATED TO CONFIGURING DEVICES IN A MODULE

CROSS-REFERENCE TO RELATED APPLICATION(S)

This application is a continuation of U.S. patent application Ser. No. 17/682,954, filed Feb. 28, 2022, entitled "SYSTEMS AND METHODS RELATED TO CONFIGURING DEVICES IN A MODULE," which is a continuation of U.S. patent application Ser. No. 16/859,961, filed Apr. 27, 2020, entitled "CONFIGURING DEVICES IN A MODULE," now U.S. Pat. No. 11,263,159, issued Mar. 1, 2022, which is a continuation of U.S. patent application Ser. No. 15/338,061, filed Oct. 28, 2016, entitled "CONFIGURING DEVICES IN A MODULE," now U.S. Pat. No. 10,635,616, issued Apr. 28, 2020, which claims priority to U.S. Provisional Patent Application No. 62/247,742, filed Oct. 28, 2015, entitled "CIRCUITS, DEVICES, AND METHODS FOR REDUCING LATENCY IN A SERIAL BUS," U.S. Provisional Patent Application No. 62/290,906, filed Feb. 3, 2016, entitled "CONFIGURING, COUPLING, AND DECOUPLING DEVICES IN A MODULE," and U.S. Provisional Patent Application No. 62/290,336, filed Feb. 2, 2016, entitled "COUPLING AND DECOUPLING DEVICES IN A MODULE," the contents of each of which are hereby expressly incorporated by reference herein in their entireties for all purposes.

BACKGROUND

Field

The present disclosure relates to modules for radio-frequency (RF) applications.

Description of Related Art

Many electronic devices include circuits, devices, components, and/or modules configured to provide wireless functionality (e.g., wireless local area network (WLAN) or cellular functionality). Such a wireless functionality allows an electronic device to communicate with one or more other devices in a wireless manner. The circuits, devices, components, and/or modules may be included in a module such as a front-end module (FEM).

SUMMARY

In some implementations, the present disclosure relates to a radio-frequency (RF) module. The radio-frequency module includes a serial bus including a first serial data line and a second serial data line. The radio-frequency module also includes a first switch coupled to a first device and a third line. The radio-frequency module further includes a module coupled to the serial bus and the first switch, the module configured to determine whether first data is detected on a first serial data line, determine whether second data is detected on a second serial data line, and adjust a configuration of the first switch when the first data is detected on the first serial data line and the second data is detected on the second serial data line.

In some embodiments, the module is configured to adjust the configuration of the first switch by coupling the first device to the third line via the first switch based on the first data and the second data.

In some embodiments, coupling the first device to the third line comprises closing the first switch or adjusting a position of the first switch.

In some embodiments, the module is configured to adjust the configuration of the first switch by decoupling the first device from the third line via the first switch based on the first data and the second data.

In some embodiments, decoupling the first device from the third line comprises opening the first switch or adjusting a position of the first switch.

In some embodiments, the radio-frequency module further includes a second device coupled to the first switch.

In some embodiments, the module is further configured to adjust the configuration of the first switch by coupling the second device to the third line via the first switch based on the first data on the second data.

In some embodiments, the module is configured to adjust the configuration of the first switch by decoupling the second device from the third line via the first switch based on the first data and the second data.

In some embodiments, the radio-frequency module further includes the first device.

In some embodiments, the first device is configured to obtain a command based on the first data when the first data is detected on the first serial data line and when the second data is not detected on the second serial data line.

In some embodiments, the first device comprises a diplexer.

In some embodiments, the first device comprises a power amplifier.

In some embodiments, the first device comprises a low-noise amplifier (LNA).

In some embodiments, the first device comprises a filter.

In some embodiments, the first device comprises a matching circuit.

In some embodiments, the first device comprise a load circuit.

In some implementations, the present disclosure relates to an electronic device. The electronic device includes a radio-frequency (RF) module including a serial bus including a first serial data line and a second serial data line, a first switch coupled to a first device and a third line, and a module coupled to the serial bus and the first switch, the module configured to determine whether first data is detected on a first serial data line, determine whether second data is detected on a second serial data line, and adjust a configuration of the first switch when the first data is detected on the first serial data line and the second data is detected on the second serial data line.

In some embodiments, the module is configured to adjust the configuration of the first switch by coupling the first device to the third line via the first switch based on the first data and the second data.

In some embodiments, coupling the first device to the third line comprises closing the first switch or adjusting a position of the first switch.

In some embodiments, the module is configured to adjust the configuration of the first switch by decoupling the first device from the third line via the first switch based on the first data and the second data.

In some embodiments, decoupling the first device from the third line comprises opening the first switch or adjusting a position of the first switch.

In some embodiments, the electronic device further includes a second device coupled to the first switch.

In some embodiments, the module is further configured to adjust the configuration of the first switch by coupling the second device to the third line via the first switch based on the first data on the second data.

In some embodiments, the module is configured to adjust the configuration of the first switch by decoupling the second device from the third line via the first switch based on the first data and the second data.

In some embodiment, the electronic device further includes the first device.

In some embodiments, the first device is configured to obtain a command based on the first data when the first data is detected on the first serial data line and when the second data is not detected on the second serial data line.

In some embodiments, the first device comprises a diplexer.

In some embodiments, the first device comprises a power amplifier.

In some embodiments, the first device comprises a low-noise amplifier (LNA).

In some embodiments, the first device comprises a filter.

In some embodiments, the first device comprises a matching circuit.

In some embodiments, the first device comprise a load circuit.

In some implementations, the present disclosure relates to a method. The method includes determining whether first data is detected on a first serial data line of a serial bus. The method also includes determining whether second data is detected on a second serial data line of the serial bus. The method further includes adjusting a configuration of a first switch when the first data is detected on the first serial data line and the second data is detected on the second serial data line.

In some embodiments, adjusting the configuration of the first switch comprises coupling a first device to a third line via the first switch based on the first data and the second data.

In some embodiments, coupling the first device to the third line comprises closing the first switch or adjusting a position of the first switch.

In some embodiments, adjusting the configuration of the first switch comprises decoupling a first device from a third line via the first switch based on the first data and the second data.

In some embodiments, decoupling the first device from the third line comprises opening the first switch or adjusting a position of the first switch.

In some embodiments, adjusting the configuration of the first switch comprises coupling a second device to a third line via the first switch based on the first data on the second data.

In some embodiments, adjusting the configuration of the first switch comprises decoupling a second device from a third line via the first switch based on the first data and the second data.

In some implementations, the present disclosure relates to a radio-frequency (RF) module. The radio-frequency module includes a serial bus including a first serial data line and a second serial data line. The radio-frequency module also includes a third line coupled to a first device via a first switch. The radio-frequency module further includes a module coupled to the serial bus and the first switch, the module configured to determine whether first data is detected on a first serial data line, determine whether second data is detected on a second serial data line, and adjust a configuration of the first switch when the first data is detected on the first serial data line and the second data is detected on the second serial data line.

In some embodiments, the radio-frequency module further includes the first switch.

In some embodiments, the radio-frequency module further includes the first device.

In some implementations, the present disclosure relates to a radio-frequency (RF) module. The radio-frequency module includes a serial bus including a first serial data line and a second serial data line. The radio-frequency module also includes a first switch coupled to a first device and a third line. The radio-frequency module further includes a module coupled to the serial bus and the first switch, the module configured to determine whether first data is detected on a first serial data line, determine whether second data is detected on a second serial data line, ad adjust a configuration of the first switch when the first data is detected on the first serial data line and the second data is detected on the second serial data line.

In some embodiments, the module is configured to adjust the configuration of the first switch by coupling the first device to the third line via the first switch based on the first data and the second data.

In some embodiments, coupling the first device to the third line comprises closing the first switch or adjusting a position of the first switch.

In some embodiments, the module is further configured to adjust the configuration of the first switch by identifying a register based on one or more of the first data or the second data.

In some embodiments, the module is further configured to adjust the configuration of the first switch by obtaining state information from the registers and coupling the first device to the third line based on the state information.

In some embodiments, the module is configured to adjust the configuration of the first switch by decoupling the first device from the third line via the first switch based on the first data and the second data.

In some embodiments, decoupling the first device from the third line comprises opening the first switch or adjusting a position of the first switch.

In some embodiments, the module is further configured to adjust the configuration of the first switch by identifying a register based on one or more of the first data or the second data.

In some embodiments, the module is further configured to adjust the configuration of the first switch by obtaining state information from the registers and decoupling the first device from the third line based on the state information.

In some implementations, the present disclosure relates to a wireless device. The wireless device includes a serial bus including a first serial data line and a second serial data line. The wireless device also includes a processor coupled to the serial bus, the processor configured to determine whether first data is detected on a first serial data line, determine whether second data is detected on a second serial data line, and cause a module to adjust a configuration of the first switch when the first data is detected on the first serial data line and the second data is detected on the second serial data line.

In some embodiments, the wireless device further includes the module, the module including a first switch coupled to a first device and a third line.

In some embodiments, the module is configured to adjust the configuration of the first switch by coupling the first device to the third line via the first switch based on the first data and the second data.

In some embodiments, coupling the first device to the third line comprises closing the first switch or adjusting a position of the first switch.

In some embodiments, the module is further configured to adjust the configuration of the first switch by identifying a register based on one or more of the first data or the second data.

In some embodiments, the module is further configured to adjust the configuration of the first switch by obtaining state information from the registers and coupling the first device to the third line based on the state information.

In some embodiments, the module is configured to adjust the configuration of the first switch by decoupling the first device from the third line via the first switch based on the first data and the second data.

In some embodiments, decoupling the first device from the third line comprises opening the first switch or adjusting a position of the first switch.

In some embodiments, the module is further configured to adjust the configuration of the first switch by identifying a register based on one or more of the first data or the second data.

In some embodiments, the module is further configured to adjust the configuration of the first switch by obtaining state information from the registers and decoupling the first device from the third line based on the state information.

In some implementations, the present disclosure relates to a radio-frequency (RF) module. The radio-frequency module includes a serial bus including a first serial data line and a second serial data line. The radio-frequency module further includes a control component coupled to the serial bus and the first switch, the control component configured to determine whether first data is detected on the first serial data line, determine whether second data is detected on the second serial data line, and decode a command based on the first data and second data when the first data is detected on the first serial data line and when the second data is detected on the second serial data line.

In some embodiments, the control component is further configured to decode the command based on the first data when the first data is detected on the first serial data line and when the second data is not detected on the second serial data line.

In some embodiments, the control component is further configured to configure a first device based on the command.

In some embodiments, the control component is configured to configure the first device by accessing a register based on the command, the register including state information for the first device.

In some embodiments, the radio-frequency module further includes the first device.

In some embodiments, the radio-frequency module is coupled to the first device via a third data line.

In some embodiments, the command is in a first format when the first data is detected on the first signal line and when the second data is detected on the second signal line.

In some embodiments, the first command is in a second format when the first data is detected on the first signal line and when the second data is not detected on the second signal line.

In some embodiments, the second format comprises a radio-frequency front-end (RFFE) format.

In some embodiments, the radio-frequency module comprises a front-end module (FEM).

In some embodiments, the radio-frequency module comprises a master device.

In some embodiments, the first device comprises a slave device.

In some embodiments, the first device comprises a diplexer.

In some embodiments, the first device comprises a power amplifier.

In some embodiments, the first device comprises a low-noise amplifier (LNA).

In some embodiments, the first device comprises a filter.

In some embodiments, the first device comprises a matching circuit.

In some embodiments, the first device comprise a load circuit.

In some implementations, the present disclosure relates to a method. The method includes determining whether first data is detected on the first serial data line of a radio-frequency module. The method also includes determining whether second data is detected on the second serial data line of the radio-frequency module. The method further includes decoding a command based on the first data and second data when the first data is detected on the first serial data line and when the second data is detected on the second serial data line.

In some embodiments, the method further includes decoding the command based on the first data when the first data is detected on the first serial data line and when the second data is not detected on the second serial data line.

In some embodiments, the method further includes configuring a first device based on the command.

In some embodiments, configuring the first device comprises accessing a register based on the command, the register including state information for the first device.

In some embodiments, the radio-frequency module is coupled to the first device via a third data line.

In some embodiments, the command is in a first format when the first data is detected on the first signal line and when the second data is detected on the second signal line.

In some embodiments, the first command is in a second format when the first data is detected on the first signal line and when the second data is not detected on the second signal line.

In some embodiments, the second format comprises a radio-frequency front-end (RFFE) format.

In some embodiments, the radio-frequency module comprises a front-end module (FEM).

In some embodiments, the method comprises a master device.

In some embodiments, the first device comprises a slave device.

In some embodiments, the first device comprises a diplexer.

In some embodiments, the first device comprises a power amplifier.

In some embodiments, the first device comprises a low-noise amplifier (LNA).

In some embodiments, the first device comprises a filter.

In some embodiments, the first device comprises a matching circuit.

In some embodiments, the first device comprise a load circuit.

In some implementations, the present disclosure relates to a wireless device. The wireless device includes a serial bus including a first serial data line and a second serial data line. The wireless device also includes a control component coupled to the serial bus and the first switch, the control component configured to determine whether first data is detected on the first serial data line, determine whether second data is detected on the second serial data line, and decode a command based on the first data and second data when the first data is detected on the first serial data line and when the second data is detected on the second serial data line.

BRIEF DESCRIPTION OF THE DRAWINGS

FIG. 3 is a timing diagraming illustrating example data that may be communicated with a serial bus/interface, according to some embodiments of the present disclosure.

FIG. 4 an example command (or message) that may be used with a serial bus/interface, according to some embodiments of the present disclosure.

DETAILED DESCRIPTION OF SOME EMBODIMENTS

Figure 1:
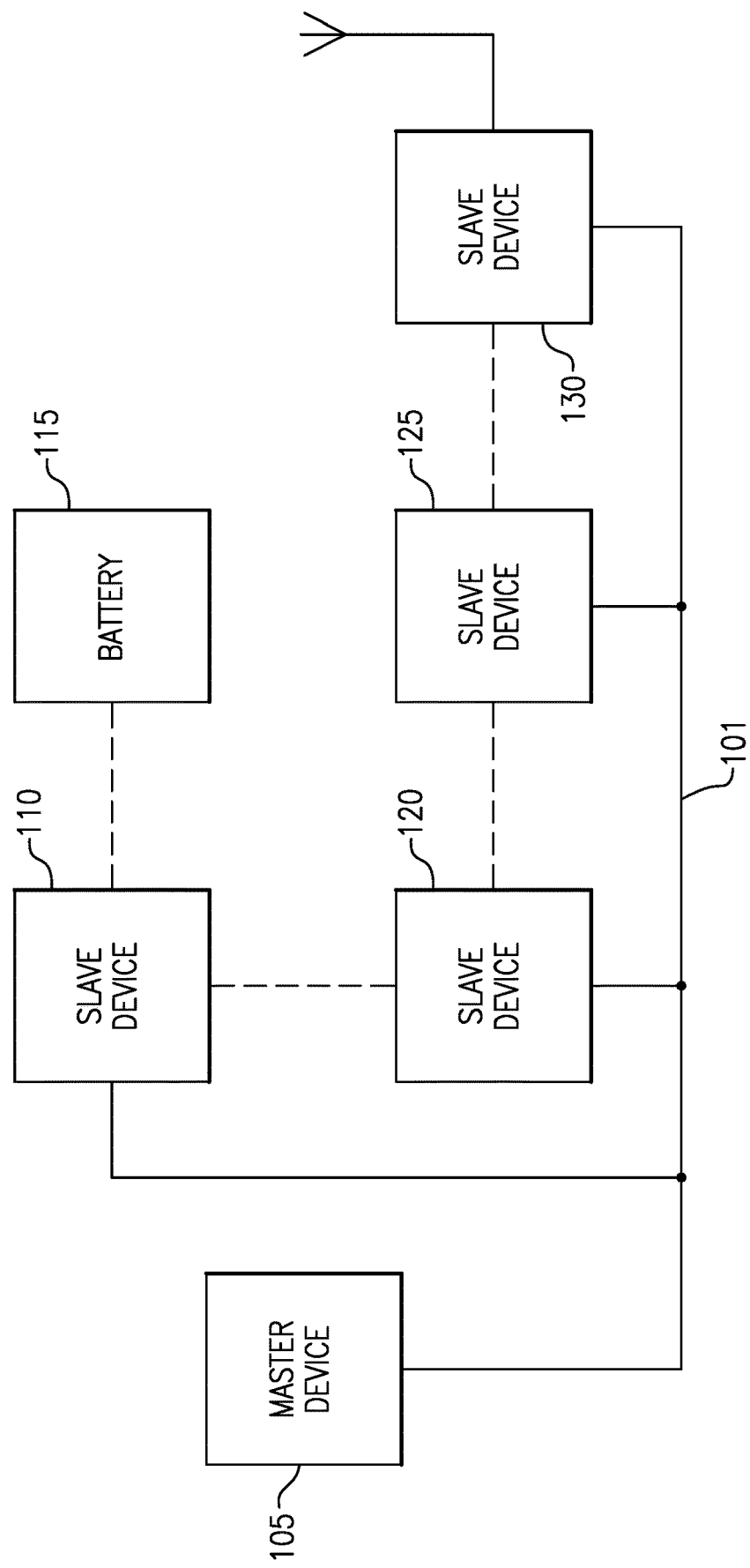
FIG. 1 is a block diagram of device/components coupled together via a serial bus/interface, according to some embodiments of the present disclosure.

The headings provided herein, if any, are for convenience only and do not necessarily affect the scope or meaning of the claimed invention.

Disclosed are non-limiting examples of systems, devices, circuits and/or methods related to techniques for configuration, coupling, and/or decoupling devices, components, circuits, and/or modules based on data received via a serial interface/bus. Although the present disclosure may be described in the context of a serial bus/interface, it will be understood that one or more features of the present disclosure may also be utilized in other applications. For example, the examples, embodiments, implementations, and/or features described herein may be utilized with an RF front-end (RFFE) bus, an Inter-Integrated Circuit (I2C) bus, a serial peripheral interface (SPI), and/or other types of serial buses/interfaces.

Many wireless communication devices (e.g., a cellular handset system) use a serial bus to communicate between modules and/or components of the wireless communication devices. The use of serial buses in these wireless communication devices may allow for increased complexity of the radio-frequency (RF) front-end components and the configuration of the RF front-end (RFFE) components used in the wireless communication devices. For example, multiple configuration modes, detailed feedback, and timing synchronization may be accomplished using interface signals shared amongst multiple RF devices/components. Examples of the devices/components on that may use a serial bus may include, but are not limited to, a power amplifier (PA), a RF power supply management component/module, a low-noise amplifiers (LNA), a diplexer, a filter, a load circuit, a matching circuit, an antenna switch, and an antenna tuner.

Many devices, modules, and/or components use a serial interface to reduce the number of package pins (e.g., lines, control lines, data lines, signal lines, etc.) and associated board-level routing. For example, an RF device component and/or module may generally use two signals to communicate data, a clock signal and a data signal, as discussed in more detail below. A serial interface may increase latency in transmitting, receiving, and/or processing data (e.g., commands). For example, in order to transmit a data (e.g., data such as a command, a frame, a message, etc.) that is eight bits long, a RF device, module, and/or component may use multiple clock cycles (e.g., eight clock cycles) to transmit the data. An RF device, module, and/or component may not be able to begin transmitting additional data (e.g., new data) until the previous data has been completely transmitted, due to the serial nature of the serial interface.

Described herein are examples of coupling and/or decouple devices, components, circuits, and/or modules based on data received via a serial interface/bus, such as the RFFE interface/bus (e.g., a Mobile Industry Processor Interface (MIPI) RFFE interface/bus). In one embodiment, a module may determine whether first data is detected on a first serial data line and may determine whether second data is detected on a second serial data line. The module may adjust the configuration of one or more switches (e.g., a set of switches) to couple and/or decouple one or more devices, circuits, and/or components of the module, based on whether the first data is detected/received and whether the second data is detected/received.

FIG. 1 is a block diagram of device/components (e.g., RF devices/components) coupled together via a serial bus/interface (e.g., an RFFE bus/interface), according to some embodiments of the present disclosure. The master device 105, the slave devices 110, 120, 125, and 130, and the serial bus 101 may be part of an RF front end module (FEM). The serial bus 101 may include one or more lines (e.g., pins, data lines, signal lines, clock lines, etc.), as discuss in more detail below. The master device 105 device/component may control the configuration and/or operation of the slave devices 110, 120, 125, and 130 coupled to the serial bus 101. For example, the master device 105 device/component may control the configuration and/or operation of one or more of the slave device 110, slave device 120, slave device 125, and slave device 130. As illustrated in FIG. 1, the master device 105, slave device 110, slave device 120, slave device 125 and slave device 130 are coupled to each other via the serial bus 101. In one embodiment, one or more of the slave devices may also be coupled to each other, separate from the serial bus 101. For example, slave device 110 may be coupled directly to slave device 120. In another example, slave device 120 may be coupled directly to slave device 125. In a further example, slave device 125 may be coupled directly to slave device 130. The slave device 110 is coupled to a battery 115 (e.g., a power source, a voltage source, etc.). The master device 105 may be referred to as a master module, a master component, a master, etc. The slave devices 110, 120, 125, and 130 may be referred to as slave slaves modules, slave components, slaves, etc.

The master device 105 may transmit data such as messages, commands, packets, frames, etc., to the slave devices 110, 120, 125, and 130 to control the operation of the slave devices and/or to configure each slave device. For example, the master device 105 may transmit one or more messages (e.g., configuration messages or messages with data indicating how a slave device/component should operate or be configured) to the slave device 120. In another example, the master device 105 may transmit a command (e.g., RFFE commands such as a read command, a write command, an extended read command, an extended write command, etc.) to the slave device 125. When a slave device receives the command, the slave device may perform one or more operations based on the command. For example, the slave device 110 may read data from a memory address, write data to a memory address, modify a configuration of the slave device 110, etc., based on the command received from the master device 105.

Although the present disclosure may refer to an RFFE bus/interface (e.g., a MIPI RFFE bus/interface), on one having ordinary skill in the art understands that the examples, embodiments, and/or implementations described herein may be applied to other types of buses/interfaces. The examples, embodiments, and/or implementations may be applied other types of serial interfaces such as an I2C bus/interface, a serial peripheral interface (SPI), etc.

Figure 2A:
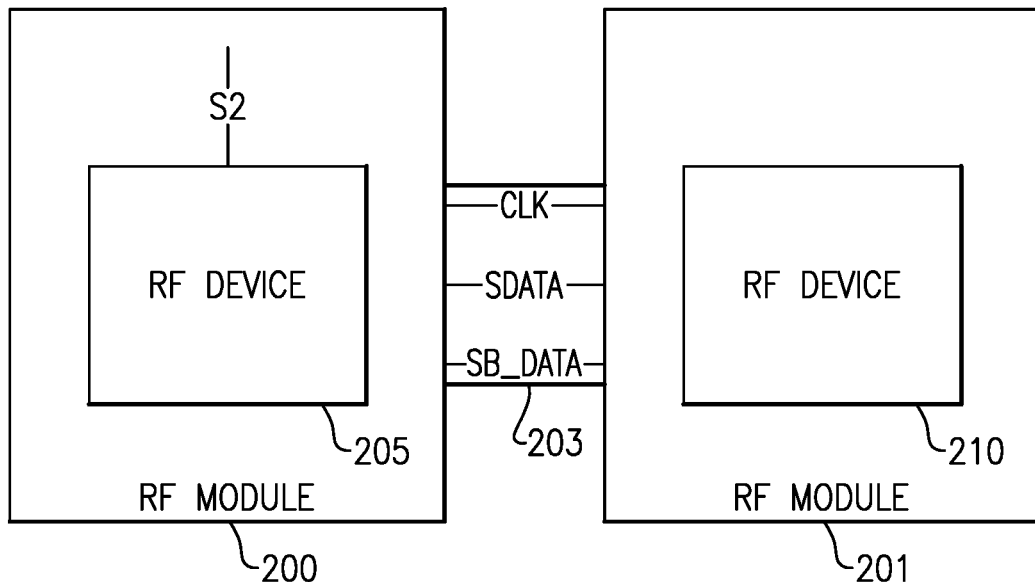
FIG. 2A is a block diagram illustrating example RF modules, according to some embodiments of the present disclosure.

FIG. 2A is a block diagram illustrating a RF module 200 and a RF module 201, according to some embodiments of the present disclosure. RF module 200 includes an RF device 205 and RF module 201 includes RF device 210. As illustrated in FIG. 2A, the RF device 205 and the RF device 210 are located in separate RF modules. In one embodiment, the RF module 200 may be coupled to the RF module 201 via a serial bus 203 (e.g., a MIPI RFFE bus). The serial bus 203 may include multiple lines (e.g., multiple pins, multiple traces, etc.) that may communicate (e.g., transmit and/or receive) signals and/or data between the RF module 200 and the RF module 201. The RF device 205 and RF device 210 may use the serial bus 203 to communicate signals and/or serial data. As illustrated in FIG. 2A, the serial bus 203 includes a SDATA line that may transmit serial data (e.g., messages, commands, frames, packets, bits, etc.) between the RF module 200 and the RF module 201. For example, the SDATA line may communicate data one bit at a time (e.g., may communicate data serially or sequentially). The SDATA line may be referred to as an SDATA signal line. The serial bus 203 also includes a SB_DATA line that may transmit serial data (e.g., messages, commands, frames, packets, bits, etc.) between the RF module 200 and the RF module 201. The SB_DATA line may also be referred to as a sideband data line or a SB_DATA signal line. The serial bus 203 further includes a CLK line that may transmit a clock signal between the RF module 200 and the RF module 201. The RF device 205 and the RF device 210 may use the clock signal and/or the CLK line to control the timing of the serial bus 203. For example, the serial bus 203 may operate at the frequency of the clock signal (e.g., the SDATA line may be synchronized with the clock signal).

In one embodiment, the RF device 205 may transmit first data to the RF device 210 via the SDATA line and/or may transmit second data to the RF device 210 via the SB_DATA line. For example, the RF device 205 may transmit first data to the RF device 210 (via the SDATA line) and may not transmit second data to the RF device 210 (e.g., may not transmit the second data via the SB_DATA line). In another example, the RF device 205 may transmit first data to the RF device 210 (via the SDATA line) and may transmit second data to the RF device 210 (via the SB_DATA line). In one embodiment, the RF device 210 may determine whether first data is detected on the SDATA line (e.g., a first serial data line) and may determine whether second data is detected on the SB_DATA line (e.g., a second serial data line). The RF device 210 may adjust the configuration of one or more switches (e.g., a set of switches) based on whether the first data is detected/received and whether the second data is detected/received, as discussed in more detail below.

Figure 2B:
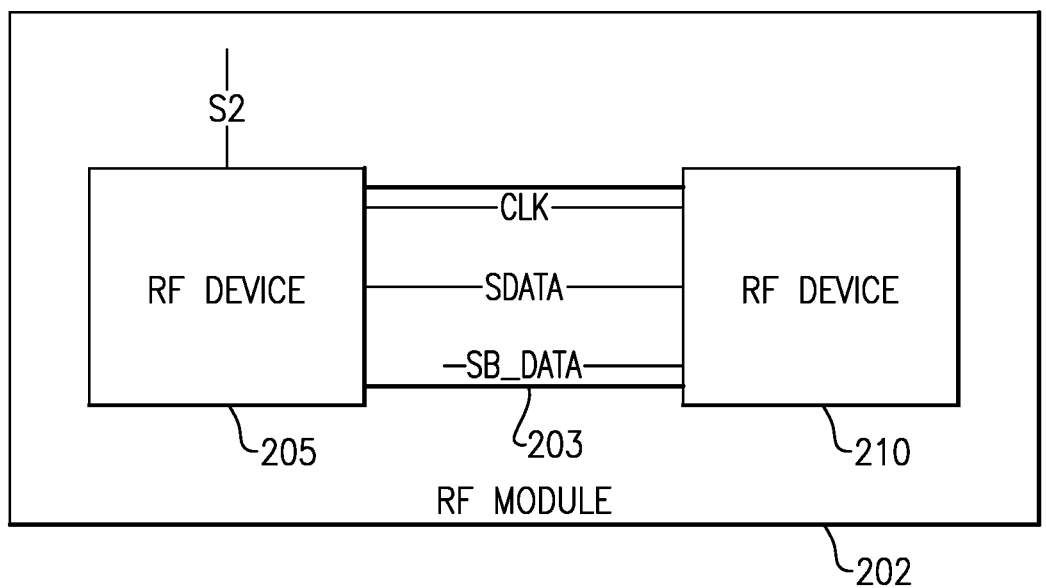
FIG. 2B is a block diagram illustrating example RF modules, according to some embodiments of the present disclosure.

FIG. 2B is a block diagram illustrating an example RF module 202, according to some embodiments of the present disclosure. RF module 202 includes the RF device 205 and the RF device 210. The RF device 205 may be coupled to the RF device 210 via a serial bus 203 (e.g., a MIPI RFFE bus). The serial bus 203 may include multiple lines (e.g., multiple pins, multiple traces, etc.) that may communicate (e.g., transmit and/or receive) signals and/or data between the RF module 200 and the RF module 201, as discussed above. The RF device 205 and RF device 210 may use the serial bus 203 to communicate signals and/or serial data, as discussed above. As illustrated in FIG. 2B, the serial bus 203 includes a SDATA line that may transmit serial data (e.g., messages, commands, frames, packets, bits, etc.) between the RF device 205 and the RF device 210. The serial bus 203 also includes an SB_DATA line that may transmit serial data (e.g., messages, commands, frames, packets, bits, etc.) between the RF device 205 and the RF device 210. The serial bus 203 further includes a CLK line that may transmit a clock signal between the RF module 200 and the RF module 201. The RF device 205 and the RF device 210 may use the clock signal and/or the control the timing of the transmission of data, as discussed above. The RF device 205 and/or RF device 210 may adjust the configuration of one or more switches (e.g., a set of switches) based on whether the first data is detected/received and whether the second data is detected/received, as discussed in more detail below.

FIG. 3 is a timing diagraming illustrating example data that may be communicated with a serial bus/interface (e.g., a MIPI RFFE bus/interface), according to some embodiments of the present disclosure. As discussed above, data may be communicated between devices (e.g., RF devices/modules illustrated in FIGS. 1, 2A and 2B) via the serial bus/interface (e.g., via the SDATA). For example, a master device may transmit data to a slave device. In another example, a slave device may transmit data to a master device. In a further example, a slave device may transmit data to a slave device. The serial bus/interface may include a CLK line (used to transmit/receive a clock or CLK signal) and a SDATA line used to transmit/receive the data such as bits, messages, frames, packets, etc.). The clock signal (e.g., CLK signal) may be used to control the timing of the serial bus/interface. For example, the SDATA line may be synchronized with the clock signal. In another example, the serial bus/interface may operate at the frequency of the signal CLK (e.g., the SDATA signal line may be synchronized with the signal CLK).

The serial bus/interface may generally include two signals/lines, the CLK signal line (used to transmit/receive the signal CLK) and the SDATA signal line (used to transmit/receive the signal SDATA). As discussed above, a command may be transmitted by a master device and may be received/processed by a slave device. As illustrated in FIG. 3, the command may a (MIPI) RFFE Register 0 Write command. The command may be transmitted and/or received using the SDATA signal line. The RFFE Register 0 Write command may include a sequence start condition (SSC), 4-bits to identify/indicate a slave device (e.g., bits SA3, SA2, SA1, and SA0 that may indicate/identify the RFFE slave), one bit to identify/indicate the command/operation (e.g., the register 0 write command), 7-bits to identify/indicate the data (e.g., bits D6, D5, D4, D3, D2, D1, and D0), and one bit to identify the parity of the command. Other commands (e.g., RFFE commands) may also include one or more bytes to identify/indicate the address and data to be written into the memory address of the slave device (e.g., RFFE slave).

As discussed above, the serial bus/interface may be a serial bus/interface that transmit each bit of data (e.g., each bit of the command) serially (e.g., sequentially). The command (illustrated in FIG. 2) may take 15 clock cycles to transmit (e.g., the master device may take 15 clock cycles to completely transmit the RFFE command). Thus, the slave device may wait 15 clock cycles before the slave device may decode and/or process the command because the slave device is waiting for the master device to completely transmit the command. In one example, the RFFE bus interface may operate at a rate/frequency of 52 megahertz (e.g., the signal CLK has a frequency of 52 megahertz). If the serial bus/interface operates at 52 megahertz, the latency experienced by the slave device in receiving, decoding, and/or processing the command (e.g., the delay before the RFFE slave may receive, decode, and/or process the RFFE command) may be 288 nanoseconds. Commands transmitted using a serial bus/interface that includes two signal lines (e.g., the CLK signal line and the SDATA signal line) may be in a first format (e.g., a first command format). In one embodiment, the first format may be a standardized format (e.g., an industry standard format) such as the RFFE command format. In other embodiments, other types of commands may take a different number of clock cycles to transmit. For example, a command may take 16 clock cycles (e.g., 308 ns) to transmit. In addition, if multiple modules (e.g., multiple RFFE slaves) are to be reconfigured, commands may be transmitted to each of the multiple modules. Thus, the amount of time it takes for each command transmitted to each of the multiple modules (e.g., 288 ns for each command transmitted to each of the multiple modules) may also increase the latency e.g., delay) in transmitting, receiving, processing, and/or decoding commands and/or other data that is communicated using the serial bus/interface.

With increasing complexity in modern wireless communication devices and with users demanding ever increased speed, it may be useful to decrease the latency (e.g., delay) in transmitting, receiving, processing, and/or decoding commands and/or other data that is communicated using the serial bus/interface.

FIG. 4 an example command (or message) that may be used with a serial bus/interface, according to some embodiments of the present disclosure. In one embodiment, the serial bus/interface may be modified to include three signals/lines (or more than three signals/lines). As illustrated in FIG. 3, a serial bus/interface (e.g., the RFFE bus/interface) may be modified to include the CLK signal line (used to transmit the signal CLK), the SDATA signal line (used to transmit the signal SDATA), and the SB_DATA (e.g., sideband data) signal line (used to transmit the signal SB_DATA). As discussed above, the signal CLK may be used to control the timing of the serial bus/interface. The signal SDATA and signal SB_DATA may be synchronized with the signal CLK.

As illustrated in FIG. 4, command may be transmitted using two (e.g., multiple) signals/lines, the SDATA signal line and the SB_DATA signal line. For example, the SDATA signal line may be used to transmit the SSC and 4-bits to identify/indicate a RFFE slave (e.g., bits SA3, SA2, SA1, and SA0 that may indicate/identify the RFFE slave). In one embodiment, the signal SB_DATA may include information that may be decoded in parallel with a MIPI RFFE-compliant command included in the signal SDATA. For example, the SB_DATA signal line may be used to transmit 4-bits that may indicate/identify a command and/or a memory address. The command illustrated in FIG. 4 may be in a second format that is different from the first format (e.g., that is different from the RFFE command format).

In one embodiment, the signal SDATA and signal SB_DATA may be received substantially simultaneously and may be decoded substantially simultaneously. Because the signal SDATA and the signal SB_DATA may be receive substantially simultaneously and may be decoded substantially simultaneously, the latency to transmit, receive, and/or process a command may be reduced. For example, instead of waiting 15 cycles before processing and/or decoding a command (as illustrated in FIG. 3), a slave device may process and/or decode the command in 6 clock cycles (e.g., in 114 ns) when the CLK is 52 megahertz because the command (e.g., different parts of the command) is transmitted using the two signals SDATA and SB_DATA simultaneously. This may reduce the latency (e.g., delay) in transmitting, receiving, processing, and/or decoding the command when compared to the latency illustrated in FIG. 2 (e.g., 288 nanoseconds). In one embodiment, the SDATA signal line and the SB_DATA signal line may allow the components/devices to parallelize the serial bus/interface. For example, the SDATA signal line and the SB_DATA signal may allow a component/device to transmit data (e.g., bits, commands, messages, etc.) in parallel rather than in serial.

One having ordinary skill in the art understands that commands having various formats may be transmitted using the SDATA signal line and the SB_DATA signal line. For example, bits that indicate/identify a write command and a memory address may be transmitted using the SDATA signal line (e.g., may be included in the signal SDATA) and the data to be written to the memory address may transmitted using the SB_DATA signal line (e.g. may be included in the signal SB_DATA). The different command formats may use different numbers and/or sequences of bits transmitted via the SDATA signal line and the SB_DATA signal to indicate/identify commands, memory address, slave devices, and/or other data. The various formats (that may be transmitted using the SDATA signal line and the SB_DATA signal line) may be standardized formats (e.g., other standardized non-RFFE command formats) or proprietary formats.

In one embodiment, a component/device (e.g., an RFFE master, an RFFE slave) may operate using multiple command formats, based on whether the SB_DATA signal is detected (e.g., based on whether data is transmitted using the SB_DATA signal line. In one embodiment, the component/device may determine whether data is detected on the SB_DATA signal line (e.g., whether data is being communicated on the SB_DATA signal line). If data is detected on the SB_DATA signal line, the component/device may determine that a command having/using the second format (e.g., a non-RFFE command format, a proprietary command format, a different standardized command format) is being transmitted on the SDATA signal line and the SB_DATA signal line. The component/device may receive and/or process the data received on the SDATA signal line and the SB_DATA signal line substantially simultaneously (as discussed above). This may allow the component/device to reduce the latency (e.g., delay) in transmitting, receiving, processing, and/or decoding data, such as messages and or commands (as discussed above).

In another embodiment, the component/device may determine whether data is detected on the SB_DATA signal line (e.g., whether data is being communicated on the SB_DATA signal line). If data is not detected on the SB_DATA signal line, the component/device may determine that a command (e.g., an RFFE command) having/using the first format (e.g., the first command format or the MIPI RFFE command data format) is being transmitted on the SDATA signal line. The component/device may receive and/or decode the command (e.g., data) received on the SDATA signal line). For example, the component/device may take 15 clock cycles to receive and/or decode the command (as discussed above) and may execute the command after the command is received, processed and/or decoded. In one embodiment, the component/device may receive data on the SDATA signal line only when data is not detected in the SB_DATA signal line. This may allow the component/device to maintain backward compatibility with different/older/legacy components/devices that do not support the SB_DATA signal line (e.g., legacy MIPI RFFE devices).

In one embodiment, the component/device may transmit/receive a full command on the SDATA signal line even though the SB_DATA signal line is also used (e.g., data is transmitted using the SB_DATA signal line). This may allow the component/device to remain compliant with different/older/legacy command formats. The component/device that receives the command on the SDATA signal line (even though the SB_DATA signal line is used) may discard portions of the command received on the SDATA line. For example, referring to FIG. 4, the component/device may discard all the bits/data received after the bit SA0. In another embodiment, the component/device may not transmit/receive a full command on the SDATA signal line even though the SB_DATA signal line is also used (e.g., data is transmitted using the SB_DATA signal line). For example, the component/device may not transmit/receive the bits/data after the bit SA0.

In one embodiment, a serial bus/interface may include one SB_DATA line per component/device that uses the serial bus/interface (e.g., one SB_DATA line per slave device). This may allow a component/device (e.g., a master device or an RFFE master) to communicate data selectively to the different components/devices (e.g., different slave devices or different RFFE slaves). For example, a RFFE master may communicate data with two out of ten RFFE slaves.

In another embodiment, the serial bus/interface may use one SB_DATA line that may be shared by multiple components/devices (e.g., multiple RFFE slaves). Each component/device may decode the data received on the SB_DATA signal line differently. For example, the data "0011" may be transmitted using the SB_DATA signal line. A first component/device may decode or interpret the data "0011" to indicate/identify a command while a second component/device may decode or interpret the data "0011" to indicate/identify a memory address/location.

Figure 5:
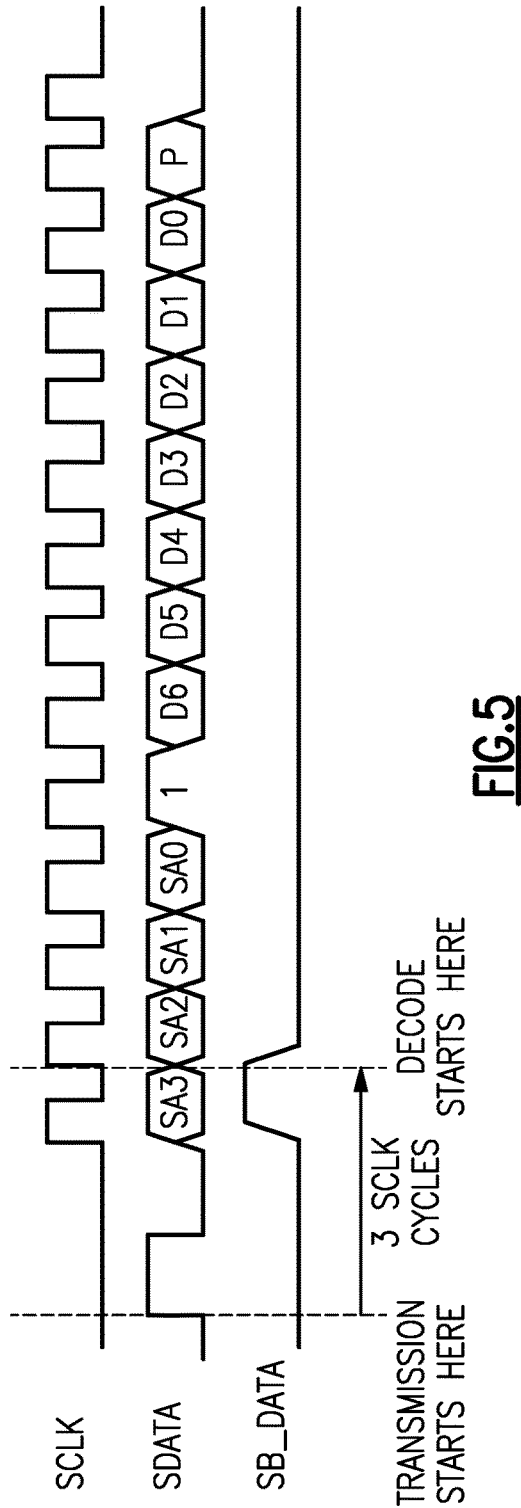
FIG. 5 an example command (or message) that may be used with a serial bus/interface, according to some embodiments of the present disclosure.

FIG. 5 an example command (or message) that may be used with a serial bus/interface, according to some embodiments of the present disclosure. As discussed above, the serial bus/interface may be modified to include three signals/lines (or more than three signals/lines), in one embodiment. As illustrated in FIG. 5, the RFFE bus interface may be modified to include the CLK signal line (used to transmit the signal CLK), the SDATA signal line (used to transmit the signal SDATA), and the SB_DATA (e.g., sideband data) signal line (used to transmit the signal SB_DATA). As discussed above, the signal CLK may be used to control the timing of the serial bus/interface. The signal SDATA and signal SB_DATA may be synchronized with the signal CLK.

As illustrated in FIG. 5, command may be transmitted using two (e.g., multiple) signals/lines, the SDATA signal line and the SB_DATA signal line. In one embodiment, the signal SB_DATA may include information which can be decoded in parallel with an RFFE-compliant command included in the signal SDATA. The command illustrated in FIG. 5 may be in a second format that is different from the first format (e.g., that is different from the RFFE command format).

In one embodiment, the signal SDATA and signal SB_DATA may be received substantially simultaneously and may be decoded substantially simultaneously. Because the signal SDATA and the signal SB_DATA may be receive substantially simultaneously and may be decoded substantially simultaneously, the latency to transmit, receive, and/or process a command may be reduced. For example, instead of waiting 15 cycles before processing and/or decoding a command (as illustrated in FIG. 3), a component/device (e.g., a slave device, and RFFE slave) may process and/or decode the command in 3 clock cycles (e.g., in 57 ns) when the CLK is 52 megahertz because the command (e.g., different parts of the command) is transmitted using the two signals SDATA and SB_DATA simultaneously. This may reduce the latency (e.g., delay) in transmitting, receiving, processing, and/or decoding the command when compared to the latency illustrated in FIG. 3 (e.g., 288 nanoseconds). In one embodiment, the SDATA signal line and the SB_DATA signal line may allow the component/device to parallelize the serial bus/interface.

One having ordinary skill in the art understands that commands having various formats may be transmitted using the SDATA signal line and the SB_DATA signal line, as discussed above. The different command formats may use different numbers and/or sequences of bits transmitted via the SDATA signal line and the SB_DATA signal to indicate/identify commands, memory address, slaves, and/or other data, as discussed above. The various formats (that may be transmitted using the SDATA signal line and the SB_DATA signal line) may be standardized formats (e.g., other standardized non-RFFE command formats) or proprietary formats.

In one embodiment, a component/device (e.g., a RFFE master, a RFFE slave) may operate using multiple command formats, based on whether the SB_DATA signal is detected (e.g., based on whether data is transmitted using the SB_DATA signal line. In one embodiment, the component/device may determine whether data is detected on the SB_DATA signal line (e.g., whether data is being communicated on the SB_DATA signal line), as discussed above. If data is detected on the SB_DATA signal line, the component/device may determine that a command having/using the second format (e.g., a non-RFFE command format, a proprietary command format, a different standardized command format) is being transmitted on the SDATA signal line. The component/device may receive and/or process the data received on the SDATA signal line and the SB_DATA signal line substantially simultaneously (as discussed above). This may allow the component/device to reduce the latency (e.g., delay) in transmitting, receiving, processing, and/or decoding data, such as messages and or commands (as discussed above).

In another embodiment, the component/device may determine whether data is detected on the SB_DATA signal line (e.g., whether data is being communicated on the SB_DATA signal line). If data is not detected on the SB_DATA signal line, the component/device may determine that a command having/using the first format (e.g., the first command format or the RFFE command data format) is being transmitted on the SDATA signal line. The component/device may receive and/or decode the command (e.g., data) received on the SDATA signal line). For example, the component/device may take 15 clock cycles to receive and/or decode the command (as discussed above) and may execute the command after the command is received, processed and/or decoded. In one embodiment, the component/device may receive data on the SDATA signal line only when data is not detected in the SB_DATA signal line. This may allow the component/device to maintain backward compatibility with different/older/legacy components/devices that do not support the SB_DATA signal line.

In one embodiment, the component/device may transmit/receive a full command on the SDATA signal line even though the SB_DATA signal line is also used (e.g., data is transmitted using the SB_DATA signal line). This may allow the component/device to remain compliant with different/older/legacy command formats. The component/device that receives the RFFE command on the SDATA signal line (even though the SB_DATA signal line is used) may discard portions of the command received on the SDATA line. In another embodiment, the component/device may not transmit/receive a full command on the SDATA signal line even though the SB_DATA signal line is also used (e.g., data is transmitted using the SB_DATA signal line). For example, the component/device may not transmit/receive the bits/data after the bit SA0.

In one embodiment, a serial bus/interface may include one SB_DATA line per component/device that uses the serial bus/interface. This may a component/device to communicate data selectively to the different components/devices. For example, the master device may communicate data with two out of ten slave device.

In another embodiment, the serial bus/interface may use one SB_DATA line that may be shared by multiple components/devices. Each component/device may decode the data received on the SB_DATA signal line differently. For example, the data "0011" may be transmitted using the SB_DATA signal line. A first component/device may decode or interpret the data "0011" to indicate/identify a command while a second component/device may decode or interpret the data "0011" to indicate/identify a memory address/location.

Figure 6:
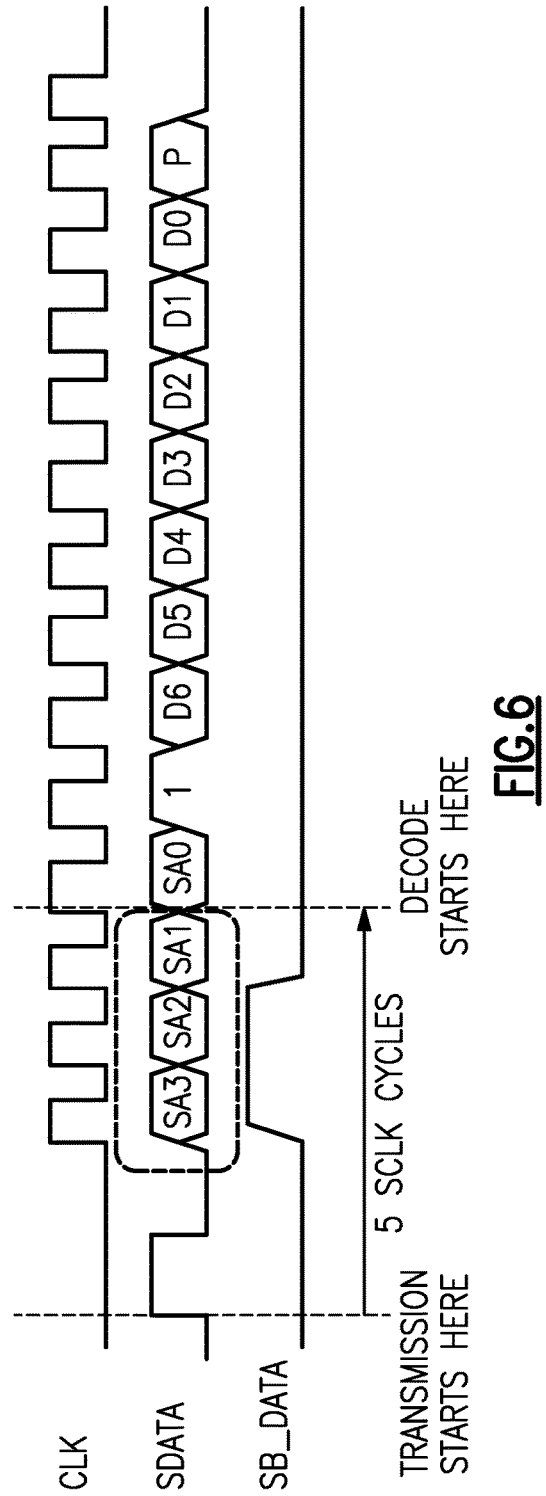
FIG. 6 is an example command (or message) that may be used with a serial bus/interface, according to some embodiments of the present disclosure.

FIG. 6 is an example command (or message) that may be used with a serial bus/interface, according to some embodiments of the present disclosure. As discussed above, the serial bus/interface may be modified to include three signals/lines (or more than three signals/lines), in one embodiment. As illustrated in FIG. 6, the RFFE bus interface may be modified to include the CLK signal line (used to transmit the signal CLK), the SDATA signal line (used to transmit the signal SDATA), and the SB_DATA (e.g., sideband data) signal line (used to transmit the signal SB_DATA). As discussed above, the signal CLK may be used to control the timing of the serial bus/interface. The signal SDATA and signal SB_DATA may be synchronized with the signal CLK.

As illustrated in FIG. 6, command may be transmitted using two (e.g., multiple) signals/lines, the SDATA signal line and the SB_DATA signal line. In one embodiment, the signal SB_DATA may include information which can be decoded in parallel with an RFFE-compliant command included in the signal SDATA. The command illustrated in FIG. 6 may be in a second format that is different from the first format (e.g., that is different from the RFFE command format).

In one embodiment, the signal SDATA and signal SB_DATA may be received substantially simultaneously and may be decoded substantially simultaneously. Because the signal SDATA and the signal SB_DATA may be receive substantially simultaneously and may be decoded substantially simultaneously, the latency to transmit, receive, and/or process a command may be reduced. For example, instead of waiting 15 cycles before processing and/or decoding a command (as illustrated in FIG. 3), a component/device (e.g., a slave device, and RFFE slave) may process and/or decode the command in 5 clock cycles (e.g., in ~96 ns) when the CLK is 52 megahertz because the command (e.g., different parts of the command) is transmitted using the two signals SDATA and SB_DATA simultaneously. For example, a module may identify a register (based on bits SA3, SA2, SA1) and may obtain state information from the identified register in 96 ns. This may reduce the latency (e.g., delay) in transmitting, receiving, processing, and/or decoding the command when compared to the latency illustrated in FIG. 3 (e.g., 288 nanoseconds). In one embodiment, the SDATA signal line and the SB_DATA signal line may allow the component/device to parallelize the serial bus/interface.

One having ordinary skill in the art understands that commands having various formats may be transmitted using the SDATA signal line and the SB_DATA signal line, as discussed above. The different command formats may use different numbers and/or sequences of bits transmitted via the SDATA signal line and the SB_DATA signal to indicate/identify commands, memory address, slaves, and/or other data, as discussed above. The various formats (that may be transmitted using the SDATA signal line and the SB_DATA signal line) may be standardized formats (e.g., other standardized non-RFFE command formats) or proprietary formats.

In one embodiment, a module (e.g., a FEM, a control component, etc.) may determine that the first three bits of data on the SDATA signal line (e.g., bits SA3, SA2, SA1) identify a register (e.g., a register number, a register address, a memory address) because data is transmitted on the SB_DATA line. The register (identified by the first three bits of data on the SDATA signal line) may include state information for the module (e.g., information indicating the state of one or more components, devices, circuits, etc.), as discussed in more detail below.

In one embodiment, a component/device (e.g., a RFFE master, a RFFE slave) may operate using multiple command formats, based on whether the SB_DATA signal is detected (e.g., based on whether data is transmitted using the SB_DATA signal line. In one embodiment, the component/device may determine whether data is detected on the SB_DATA signal line (e.g., whether data is being communicated on the SB_DATA signal line), as discussed above. If data is detected on the SB_DATA signal line, the component/device may determine that a command having/using the second format (e.g., a non-RFFE command format, a proprietary command format, a different standardized command format) is being transmitted on the SDATA signal line. The component/device may receive and/or process the data received on the SDATA signal line and the SB_DATA signal line substantially simultaneously (as discussed above). This may allow the component/device to reduce the latency (e.g., delay) in transmitting, receiving, processing, and/or decoding data, such as messages and or commands (as discussed above).

In another embodiment, the component/device may determine whether data is detected on the SB_DATA signal line (e.g., whether data is being communicated on the SB_DATA signal line). If data is not detected on the SB_DATA signal line, the component/device may determine that a command having/using the first format (e.g., the first command format or the RFFE command data format) is being transmitted on the SDATA signal line. The component/device may receive and/or decode the command (e.g., data) received on the SDATA signal line). For example, the component/device may take 15 clock cycles to receive and/or decode the command (as discussed above) and may execute the command after the command is received, processed and/or decoded. In one embodiment, the component/device may receive data on the SDATA signal line only when data is not detected in the SB_DATA signal line. This may allow the component/device to maintain backward compatibility with different/older/legacy components/devices that do not support the SB_DATA signal line.

In one embodiment, the component/device may transmit/receive a full command on the SDATA signal line even though the SB_DATA signal line is also used (e.g., data is transmitted using the SB_DATA signal line). This may allow the component/device to remain compliant with different/older/legacy command formats. The component/device that receives the RFFE command on the SDATA signal line (even though the SB_DATA signal line is used) may discard portions of the command received on the SDATA line. In another embodiment, the component/device may not transmit/receive a full command on the SDATA signal line even though the SB_DATA signal line is also used (e.g., data is transmitted using the SB_DATA signal line). For example, the component/device may not transmit/receive the bits/data after the bit SA0.

In one embodiment, a serial bus/interface may include one SB_DATA line per component/device that uses the serial bus/interface. This may a component/device to communicate data selectively to the different components/devices. For example, the master device may communicate data with two out of ten slave device.

In another embodiment, the serial bus/interface may use one SB_DATA line that may be shared by multiple components/devices. Each component/device may decode the data received on the SB_DATA signal line differently. For example, the data "0011" may be transmitted using the SB_DATA signal line. A first component/device may decode or interpret the data "0011" to indicate/identify a command while a second component/device may decode or interpret the data "0011" to indicate/identify a memory address/location.

Figure 7:
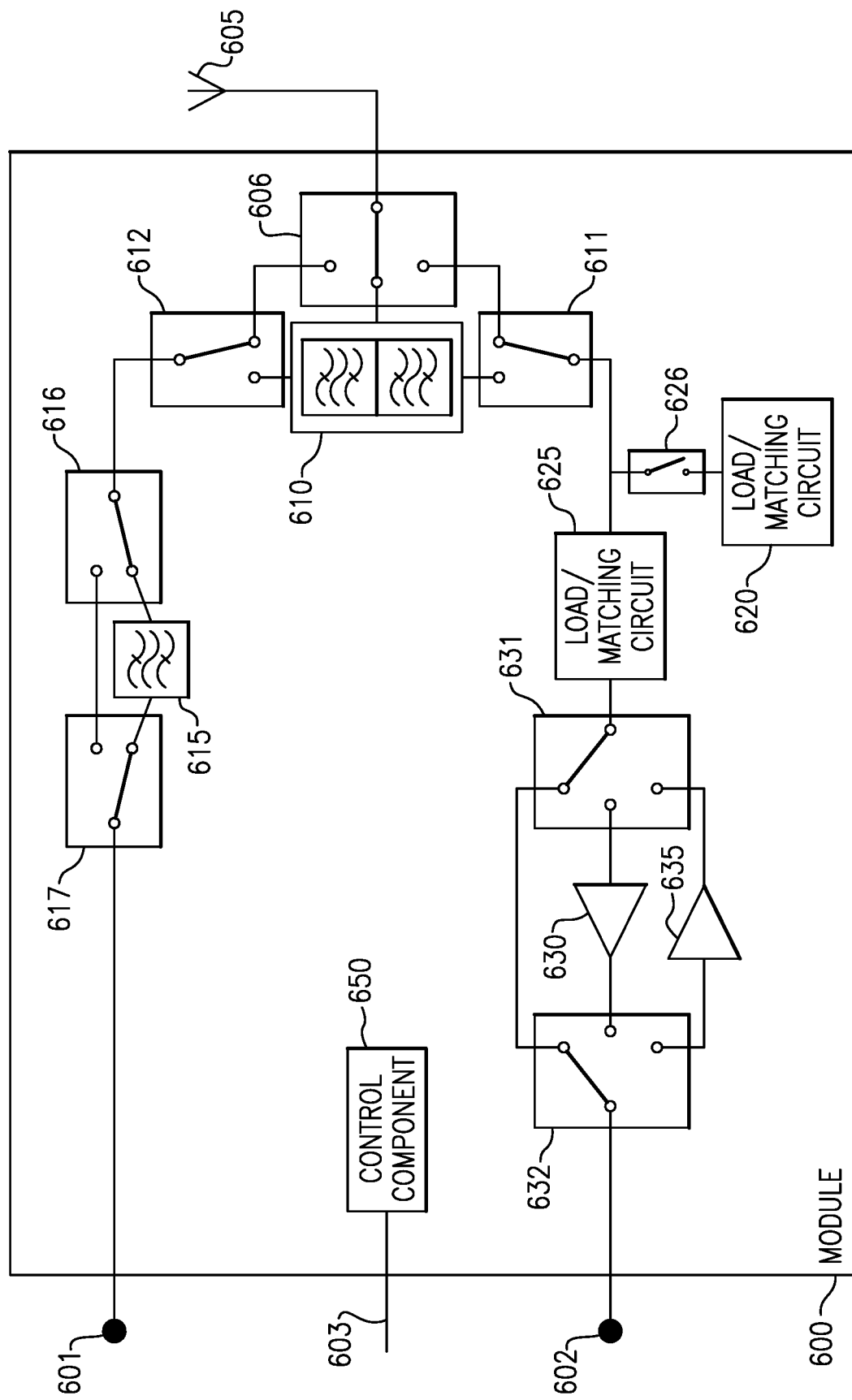
FIG. 7 is a block diagram illustrating a module 600, according to some embodiments of the present disclosure.

FIG. 7 is a block diagram illustrating a module 600 (e.g., an RF module, a front-end module (FEM), etc.), according to some embodiments of the present disclosure. The module 600 includes a diplexer 610, a filter 615, a load/matching circuit 620, a load/matching circuit 625, a low-noise amplifier (LNA) 630, and a power amplifier (PA) 635. The module 600 also includes switch 606, switch 611, switch 612, switch 616, switch 617, switch 626, switch 631, and switch 632. The module 600 further includes a control component 650 (e.g., a device, a circuit, a module, etc.) coupled to a serial bus/interface 603 (e.g., an RFFE bus/interface). The serial bus/interface 603 may include a CLK line, an SDATA line, and an SB_DATA line, as discussed above. In one embodiment, the control component 650 may adjust the configuration of one or more of switch 606, switch 611, switch 612, switch 616, switch 617, switch 626, switch 631, and switch 632 based on data received on the SDATA line and data received on the SB_DATA line. For example, the control component 650 may receive messages and/or commands via the SDATA line and/or the SB_DATA line. The control component 650 may adjust/change the positions of one or more of switch 606, switch 611, switch 612, switch 616, switch 617, switch 626, switch 631, and switch 632 based on the messages and/or commands received.

The module 600 is coupled to an antenna 605 which may transmit and/or receive signals (e.g., RF signals). The antenna 605 may be a multi-band antenna that may be capable of transmitting and/or receiving signals with different frequencies. The module 600 is also coupled to node 601 and node 602. Node 601 and 602 may provide signals to the module 600 (e.g., RF signals) and may receive signals from the module 600 (e.g., RF signals). For example, node 601 may transmit and/or receive a 5 gigahertz (GHz) signal (e.g., a 5 GHz WLAN signal) from the module 600 and node 602 may transmit and/or receive a 2.4 GHz signal (e.g., a 2.4 GHz WLAN signal) from the module 600.

As illustrated in FIG. 7, the module 600 includes a diplexer 610. The diplexer 610 may allow simultaneous operation of the module 600 in the different frequency ranges (e.g., different frequency bands). For example, the diplexer 610 may allow the module 600 to receive and/or transmit high and low WLAN frequency signals simultaneously. Although the diplexer 610 may provide multi-band functionality (e.g., may allow simultaneous operation of the module 600 in the different frequency ranges), the diplexer 610 may affect the signals that are transmitted and/or received by the RF module. For example the diplexer 610 may introduce/add insertion loss which may reduce the power of signals transmitted by the module 600. In another example, the diplexer 610 may introduce/add noise to the signals received by the module 600 (from the antenna 605). In a further example, the diplexer 610 may increase the amount of power (e.g., power consumption) used to transmit signals.

In one embodiment, the control component 650 may adjust the configurations of switch 606, switch 611, and/or switch 612 based on data detected and/or received on the SDATA line and SB_DATA line (e.g., based on first data received on the SDATA line and second data received on the SB_DATA line). For example, the control component 650 may adjust/change the positions of switch 606, switch 611 and switch 612 (based on the data detected/received) to decouple the diplexer 610 from the line (e.g., signal line) coupled to the antenna 605. In another example, the control component 650 may adjust/change the positions of switch 606, switch 611 and switch 612 (based on the data detected/received) to couple the diplexer 605 to the line (e.g., signal line) coupled to the antenna 605. The SDATA line and the SB_DATA line (of the serial bus/interface 603) may allow the control component 650 to received and/or process data (e.g., commands, messages, packets, frames, bits, etc.) more quickly. The faster receiving and/or processing of data may reduce the amount of time for the control component 650 to couple and/or decouple the diplexer from signal lines and/or devices/components of the module 600. The SDATA line and the SB_DATA line may also allow the diplexer to be coupled and/or decoupled without the use of general purpose input/out (GPIO) lines or GPIO modules (which may increase the complexity and the amount of circuitry and/or signal/data lines used by the module 600).

As illustrated in FIG. 7, the module 600 also includes a filter 615. The filter 615 may allow the module 600 to filter signals (e.g., accept and/or reject RF signals with different frequencies). Examples of filters include, but are not limited to a band-pass filter, a band-stop filter, a low-pass filter, a high-pass filter, etc. Although the filter 615 may allow the module 600 to selectively filter signals with certain frequencies, the filter 615 may introduce/add insertion loss which may reduce the power of signals transmitted by the module 600.

In one embodiment, the control component 650 may adjust the configurations of switch 616 and switch 617 based on data detected and/or received on the SDATA line and SB_DATA line (e.g., based on first data received on the SDATA line and second data received on the SB_DATA line). For example, the control component 650 may adjust/change the positions of switch 616 and switch 617 (based on the data detected/received) to decouple the filter 615 from the line (e.g., signal line) coupled to the antenna 605 and the node 601 (e.g., to bypass the filter 615). In another example, the control component 650 may adjust/change the positions of switch 616 and switch 617 (based on the data detected/received) to couple the filter 615 to the line (e.g., signal line) coupled to the antenna 605 and the node 601. As discussed above, the SDATA line and the SB_DATA line (of the serial bus/interface 603) may allow the control component 650 to received and/or process data (e.g., commands, messages, packets, frames, bits, etc.) more quickly. The faster receiving and/or processing of data may reduce the amount of time for the control component 650 to couple and/or decouple the filter 615 and may allow the filter 615 to be coupled and/or decoupled without the use of general purpose input/out (GPIO) lines or GPIO modules (which may which may increase the complexity and the amount of circuitry and/or signal/data lines used by the module 600).

As illustrated in FIG. 7, the module 600 also includes load/matching circuit 620 and load/matching circuit 625. In one embodiment, the load/matching circuit 620 and/or load/matching circuit 625 may provide impedance matching for one or more components, devices, circuits, and/or modules of the module 600. In another embodiment, the load/matching circuit 620 and/or load/matching circuit 625 may provide a load (e.g., a power source, a voltage source) for one or more components, devices, circuits, and/or modules of the module 600. Although the load/matching circuit 620 may provide impedance matching and/or may provide a load, the load/matching circuit 620 may introduce/add noise to the signals received and/or transmitted by the module 600.

In one embodiment, the control component 650 may adjust the configurations of switch 626 based on data detected and/or received on the SDATA line and SB_DATA line (e.g., based on first data received on the SDATA line and second data received on the SB_DATA line). For example, the control component 650 may adjust/change the position of switch 626 (based on the data detected/received) to decouple the load/matching circuit 620 from the line (e.g., signal line) coupled to the antenna 605 and the node 602. In another example, the control component 650 may adjust/change the position of switch 626 (based on the data detected/received) to couple the load/matching circuit 620 to the line (e.g., signal line) coupled to the antenna 605 and the node 602. As discussed above, the SDATA line and the SB_DATA line (of the serial bus/interface 603) may allow the control component 650 to received and/or process data (e.g., commands, messages, packets, frames, bits, etc.) more quickly. The faster receiving and/or processing of data may reduce the amount of time for the control component 650 to couple and/or decouple the load/matching circuit 620 and may allow the load/matching circuit 620 to be coupled and/or decoupled without the use of general purpose input/out (GPIO) lines or GPIO modules (which may which may increase the complexity and the amount of circuitry and/or signal/data lines used by the module 600).

As illustrated in FIG. 7, the module 600 also includes a LNA 630 and a PA 635. In one embodiment, PA 635 may amplify signals received from the node 602. For example, the PA 635 may convert a lower power RF signal into a higher power RF signal to drive the antenna 605. The PA 635 may be used by the module 600 when the module 600 is transmitting a signal from the node 602 to the antenna 605 (e.g., when the module 600 is transmitting). In another embodiment, the LNA 630 may amplify a lower power signal received from the antenna 605. The LNA 630 may amplify (e.g., increase) both the signal received from the antenna 605 and the noise in the signal received from the antenna 605. The LNA 630 may be used by the module 600 when the module 600 is receiving a signal from the antenna 605 and providing the signal to the node 602 (e.g., when the module 600 is receiving).

In one embodiment, the control component 650 may adjust the configurations of switch 631 and switch 632 based on data detected and/or received on the SDATA line and SB_DATA line (e.g., based on first data received on the SDATA line and second data received on the SB_DATA line). For example, the control component 650 may adjust/change the position of switch 631 and switch 632 (based on the data detected/received) to decouple LNA 630 from the line (e.g., signal line) coupled to the antenna 605 and the node 602, and to couple the PA 635 to the line. In another example, the control component 650 may adjust/change the position of switch 631 and switch 632 (based on the data detected/received) to couple LNA 630 to the line (e.g., signal line) coupled to the antenna 605 and the node 602, and to decouple the PA 635 from the line. In a further example, the control component 650 may adjust/change the position of switch 631 and switch 632 (based on the data detected/received) to decouple LNA 630 from the line (e.g., signal line) coupled to the antenna 605 and the node 602, and to decouple the PA 635 from the line (e.g., to bypass both the LNA 630 and the PA 635). As discussed above, the SDATA line and the SB_DATA line (of the serial bus/interface 603) may allow the control component 650 to received and/or process data (e.g., commands, messages, packets, frames, bits, etc.) more quickly. The faster receiving and/or processing of data may reduce the amount of time for the control component 650 to couple and/or decouple the LNA 630 and/or the PA 635. The faster receiving and/or processing of data may also allow the load/matching circuit 620 to be coupled and/or decoupled without the use of general purpose input/out (GPIO) lines or GPIO modules (which may which may increase the complexity and the amount of circuitry and/or signal/data lines used by the module 600).

In one embodiment, the control component 650 may adjust the configurations and/or operation of the PA 635 and/or the LNA 630 based on data detected and/or received on the SDATA line and SB_DATA line (e.g., based on first data received on the SDATA line and second data received on the SB_DATA line). For example, the control component 650 may adjust/change the amount of amplification performed by the PA 635 and/or the LNA 630. In another example, the control component 650 may adjust the biasing of the PA 635 and/or the LNA 630 based on data detected and/or received on the SDATA line and SB_DATA line. In a further example, the control component 650 may activate and/or deactivate (e.g., power on/power off, turn on/turn off) the PA 635 and/or the LNA 630 based on data detected and/or received on the SDATA line and SB_DATA line. As discussed above, the SDATA line and the SB_DATA line (of the serial bus/interface 603) may allow the control component 650 to received and/or process data (e.g., commands, messages, packets, frames, bits, etc.) more quickly. The faster receiving and/or processing of data may reduce the amount of time for the control component 650 to configure and/or adjust the operation of the PA 635 and/or the LNA 630. The faster receiving and/or processing of data may also allow the PA 635 and/or the LNA 630 to be reconfigured and/or adjusted without the use of general purpose input/out (GPIO) lines or GPIO modules (which may which may increase the complexity and the amount of circuitry and/or signal/data lines used by the module 600). In another embodiment, the control component may adjust the configurations and/or operation of the PA 635 and/or the LNA 630 based on data detected and/or received on the SDATA line (e.g., without using the data detected and/or received on the SB_DATA line). This may allow the module 600 to remain compliant with different/older/legacy command formats and to maintain backward compatibility with different/older/legacy components/devices that do not support the SB_DATA signal line (e.g., legacy RFFE devices).

One having ordinary skill in the art understands that the diplexer 610, the filter 615, the load/matching circuit 620, the LNA 630, and the PA 635 are merely examples of devices, circuits, modules, and/or components that may be coupled/decoupled. In other embodiments, the module 600 may include any number of devices, circuits, modules, and/or components that may be coupled and/or decoupled. For example, the module 600 may include the diplexer 610 (and may not include the filter 615, the load/matching circuits 620 and 625, the PA 635, and the LNA 630). In another example, the module 600 may include the load/matching circuits 620 and 625, the PA 635, and the LNA 630 (and may not include the diplexer 610 and the filter 615). In a further example, the module 600 may include the filter 615 (and may not include the diplexer 610, the load/matching circuits 620 and 625, the PA 635, and the LNA 630). In further embodiments, the module 600 may configure and/or control the operation of any number of devices, circuits, modules, and/or components of the module 600. For example, the module 600 may configure and/or control the operation of multiple PAs and/or multiple LNAs. In another example, the module 600 may configure and/or control the operation of an antenna switch or a voltage regulator.

As discussed above, one or more registers (e.g., memory locations) may include state information for one or more components of the module 600. For example, a first register may indicate whether the PA 635 of the module 600 should be used (e.g., whether the PA 635 should be turned off/on and/or whether the PA 635 should be coupled to the node 602 or bypassed). In another example, the register may indicate whether the filter 615 should be used (e.g., whether the filter 615 should be coupled to the node 610 or bypassed). In one embodiment, the one or more registers may be included as part of the module 600. In another embodiment, the one or more registers may be separate from the module 600 and the module 600 (e.g., control component 650) may be able to access the one or more registers (e.g., may be able to read from and/or write to the one or more registers).

Also as discussed above, the data received on the SDATA line and the SB_DATA line may identify a register (e.g., a particular register) of the one or more registers. For example, the first three bits of data transmitted in the SDATA line may identify the register. In another example, the first two bits of data transmitted in the SDATA line and the first bit of data transmitted on the SB_DATA line may be used to identify the register. The register (identified by the data detected/received on the SDATA signal line and/or SB_DATA line may include state information for one or more modules (e.g., one or more FEMs). In one embodiment, the one or more registers may be used by multiple modules 600. For example, a system (e.g., a computing device, a wireless device, etc.) may include multiple FEMs (e.g., multiple modules 600) and each of the FEMs may access the one or more registers (e.g., read from and/or write to the one or more registers) to obtain state information. Each FEM may configure, couple, and/or decouple devices, circuits, components, etc. of the FEM based on the state information. In another example, a master control component (e.g., a control component that is separate from the modules 600) may access the one or more registers to obtain state information for multiple FEMs. The master control component and may transmit data to the control components of each of the FEMs (via the SDATA and/or SB_DATA lines or via separate data/signal lines) to configure the FEMs and/or couple/decouple components, devices, circuits, of the FEMs. The master control component may also directly configure, couple, and/or decouple devices, circuits, components, etc. of the FEM based on the state information.

TABLE 1

| Register # | FEM1 | FEM2 |
| --- | --- | --- |
| 0 | TX | TX |
| 1 | BYPASS | BYPASS |
| 2 | BYPASS | LNA |
| 3 | LNA | BYPASS |
| 4 | LNA | LNA |
| 5 | | |
| 6 | | |
| 7 | | |

Table 1 above illustrates example state information that may be included in a set of registers (e.g., a set of eight registers). Register 0 may include state information indicating that the FEM1 should transmit data (e.g., should be in a TX state where a power amplifier of FEM1 is coupled to an antenna) and FEM2 should transmit data (e.g., should be in a TX state where a power amplifier of FEM2 is coupled to an antenna). Register 1 may include state information indicating that the FEM1 should bypass one or more components, devices, circuits, etc., of FEM1 (e.g., should be in a BYPASS state where a PA and LNA of FEM1 are bypassed) and FEM2 should bypass one or more components, devices, circuits, etc., of FEM2 (e.g., should be in a BYPASS state where a PA and LNA of FEM2 are bypassed). Register 2 may include state information indicating that the FEM1 should bypass one or more components, devices, circuits, etc., of FEM1 (e.g., should be in a BYPASS state where a PA and LNA of FEM1 are bypassed) and FEM2 should receive data (e.g., should be in a RX state where an LNA of FEM2 is coupled to an antenna). Register 3 may include state information indicating that the FEM1 should receive data (e.g., should be in a RX state where an LNA of FEM1 is coupled to an antenna) and FEM2 should bypass one or more components, devices, circuits, etc., of FEM2 (e.g., should be in a BYPASS state where a PA and LNA of FEM2 are bypassed). Register 4 may include state information indicating that the FEM1 should receive data (e.g., should be in a RX state where an LNA of FEM1 is coupled to an antenna) and FEM2 should receive data (e.g., should be in a RX state where an LNA of FEM2 is coupled to an antenna). Registers 5, 6, and 7 may not include state information. In other embodiments, the registers 5, 6, and 7 may be updated to include state information.

One having ordinary skill in the art that the number of registers may vary based on the number of modules (e.g., the numbers of FEMs) that may access the registers (for state information), the number of different states/state transitions, and/or the number of different configurations of the modules that may access the registers (e.g., the number of devices, components, circuits, etc., of a FEM that may be configured and/or coupled/decoupled). For example, a larger number of registers (e.g., 24 registers) may be used if a larger number of FEMs (e.g., 6 FEMs) access the registers for state information. In another example, a larger number of registers may be used of additional states are used by the FEMs.

In one embodiment, the one or more registers (e.g., the registers illustrated in Table 1) may be updated (e.g., loaded, written, etc.) with state information when a wireless device and/or a module (e.g., a FEM) begins operation (is turned on). In another embodiment, the one or more registers may be updated (e.g., loaded, written, etc.) with new and/or additional state information. For example, a processor of a wireless device (or other device, component, circuit, module, etc., of the wireless device) may update the one or more registers with new and/or additional state information. In one embodiment, it may take an amount of time and/or clock cycles to update the one or more registers. For example, it may take 500 ns to update the one or more registers.

In one embodiment, the SB_DATA line may be a GPIO line that is coupled to the module 600 and/or control component 650. In other embodiments, multiple SB_DATA lines (e.g., multiple GPIO lines) may be used (e.g., may be coupled to the module 600) and/or control component 650. More GPIO lines may reduce the number of registers that may be used to store state information for the module 600 (and for other modules).

In one embodiment, the module 600 may include multiple PAs 635 (not show in FIG. 7). The control component 650 may adjust the operation and/or configuration of the multiple PAs 635. In one embodiment, the module 600 may be used for 802.11ax applications. For example, the module 600 may be used to transmit and/or receive RF signals using the 802.11ax standard (e.g., the 802.11ax protocol or 802.11ax specification). The 802.11ax standard may increase the efficiency of wireless local-area network (WLANs). The 802.11ax standard may use multiple-input and multiple-output (MIMO), multi-user MIMO (MU-MIMO), and orthogonal frequency-division multiple access (OFDMA) to increase the efficiency of WLANs.

In one embodiment, the control component 650 may adjust the configuration of the PAs 635 and the load/matching circuit 625, to increase linearity and/or increase efficiency of the PAs 635 when the module 600 is transmitting at variable data rates within a single transmit burst (e.g., a transmission burst). As discussed above, the module 600 includes the serial bus (which includes a SDATA line and a SB_DATA line), as discussed above. The serial bus may allow the control component 650 to configure devices such as the PAs 635, more quickly and/or efficiently. For example, the serial bus may allow the control component 650 to adjust the biasing of the PAs 635 and adjust the operation of the load/matching circuit 625 in approximately 200 nanoseconds. This may allow the control component 650 to increase the efficiency and the linearity of the PAs 635 when transmitting at variable data rates within a single transmit burst.

The 802.11ax physical layer (e.g., the high efficiency physical layer (HE PHY)) may support a maximum of eight users for downlink MU-MIMO transmissions. The 802.11ax physical layer may also provide support for download and uplink OFDMA as well as for uplink MU-MIMO. When using OFDMA, the module 600 may transmit to different users on different subcarriers at different times in a transmit burst. Some of the users may be closer (in distance) and other users may be farther away in distance. Thus, the module 600 may need to switch from one modulation (e.g., 1024 quadrature amplitude modulation (1024-QAM) to another modulation (e.g., 64-QAM) from one symbol to the next. The serial bus described herein (which includes the SDATA line and the SB_DATA line) may allow the control component 650 to adjust the configuration of the PAs 635 more quickly so the module 600 may switch from one modulation to another modulation from one symbol to the next (e.g., switch from one modulation to another modulation within a transmit burst).

As discussed above, the module 600 may include multiple PAs 635 (not show in FIG. 7). The control component 650 may adjust the operation and/or configuration of the multiple PAs 635, as discussed above. In one embodiment, the module 600 may be used for WiFi (e.g., 802.11 protocols/standards/specifications) and enhanced licensed assisted access (eLAA) applications (e.g., Long-Term Evolution LAA (LTE-LAA) applications). Generally, a first set of the PAs 635 (e.g., WiFi PAs) may be used for WiFi and a second set of the PAs 635 (e.g., eLAA PAs) may be used for eLAA. The first and second set of PAS 635 may be controlled and/or configured using a serial bus (which includes a SDATA line and a SB_DATA line), as discussed above. The eLAA PAs may be configured and/or controlled using the SDATA line of the serial bus and WiFi PAs may be configured and/or controlled using the SDATA line and SB_DATA lines.

The module 600 may use both WiFi and LTE-LAA to transmit and/or receive data. Thus, the module 600 may use both 5-6 gigahertz signals (for WiFi) and signals with other frequencies for LTE-LAA (e.g., unlicensed frequencies). Generally, separate sets of PAs may be used to amplify RF signals transmitted to an antenna by the module 600 based on a mode of the module 600 (e.g., a first set of PAs for WiFi mode and a second set of PAs LTE-LAA mode). In one embodiment, the control component 650 may be a single chip (e.g., single semiconductor die), such as a Front-End Integrated Circuit (FEIC). Using a single chip for the FEIC may allow the module 600 to operate using WiFi or LTE-LAA in a manner that is conducive to lower cost, chip-scale packaging, and a smaller form factor (for the module 600). Moreover, the combination of signal conditioning functions on the same die allow for the usage of the same antenna for LTE-LAA and WiFi modes of operation. The FEIC may use the same set of PAs 635 for both LTE-LAA and WiFi modes of operation.

In one embodiment, a signal may be used to select the mode of operation of the FEIC. For example, the FEIC may operate in an LTE-LAA mode based on a signal (or a message/command) received by the FEIC. When operating in the LTE-LAA mode, a different RF amplifier transistor output stage periphery (and the associated load matching circuit commensurate with that periphery) may be used. For example, the same set of PAs 635 that is used for WiFi mode may be selected/used when the FEIC is operating in the LTE-LAA mode and different load matching circuits may be used based on the mode (e.g., LTE-LAA mode or WiFi mode). This may allow the module 600 to be to be consistent with the back-off peak to average power level needed for adjacent channel power ratio (ACPR) or other LTE centric features/capabilities. In one embodiment, allowing the FEIC to operate in LTE-LAA mode (versus WiFi mode) may allow different performance metrics to be met in in accordance the different linearity requirements of LTE (as compared to WiFi). For example, the FEIC may select the LTE-LAA mode if the system (e.g., an electronic/wireless device) called for that mode of operation. In addition, the FEIIC may use the MIPI RFFE interface rather than the standard logical interface used by WiFi. In both cases, the interface logic may be contained within the single FEIC.

In one embodiment, the set of PAs (that may be used in both WiFi and LTE-LAA modes) may be switched between different peripheries on an amplification stage (e.g., a final amplification stage). For example, a switch may selectively couple the set of PAs to a first set of periphery circuits/components that are used for LTE-LAA mode or to a second set of periphery circuits/components that are used for WiFi mode. The switch (e.g., a switch module, a switch component, a switch fabric) may also include load matching for the different sets of periphery circuits/components. The serial bus described herein may allow the switch to operate more quickly and/or efficiently (e.g., may allow the switch to couple different sets of periphery circuits/components within approximately 200 nanoseconds) which may allow the same set of PAs to be used for different modes of operation (e.g, for both WiFi and LTE-LAA modes).

In one embodiment, the serial bus (which includes the SDATA line and the SB_DATA line) may allow for faster switching between devices/components (e.g., faster coupling/decoupling) and/or may allow for faster configuration and/or reconfiguration of devices/components. Thus, the serial bus described herein may allow a module (e.g., an RF module) to select the modulation (linearity, complexity of the constellation, QAM) or range of the RF signal. The serial bus described herein may also allow a semiconductor power amplifier with selectable periphery on the output stage (and commensurate selectable load matching circuits/components) to be incorporate into an FEIC. Implementing the semiconductor power amplifier with selectable periphery on the output stage (and commensurate selectable load matching circuits/components) into one FEIC may increase power efficiency and may provide a smaller form factor for the module 600. In addition, the selectability of the digital interface to the TRx may be facilitated.

Figure 8:
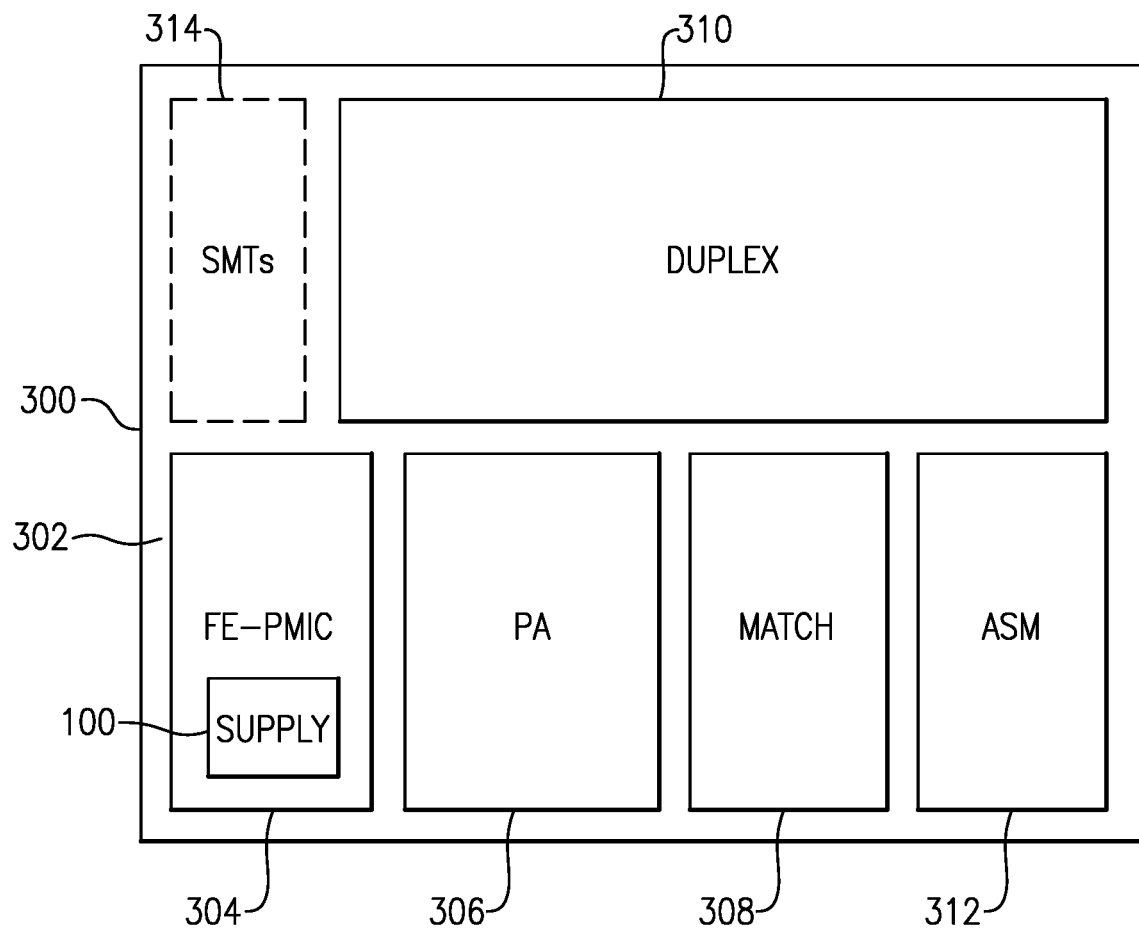
FIG. 8 is a diagram of an example module, according to some embodiments of the present disclosure.

FIG. 8 shows that in some embodiments, some or all of the devices and/or serial buses/interfaces having one or more features as described herein may be implemented in a module. Such a module may be, for example, a front-end module (FEM). In the example of FIG. 8, a radio frequency (RF) module 300 can include a packaging substrate 302, and a number of components may be mounted on such a packaging substrate. For example, a front-end power management integrated circuit (FE-PMIC) component 304, a power amplifier assembly 306, a match component 308, and a duplexer assembly 310 may be mounted and/or implemented on and/or within the packaging substrate 302. The FE-PMIC component 304 includes a supply 100 which may be a power supply (e.g., a battery, a voltage/power source) and/or may be coupled to a power supply. Other components such as a number of surface mount technology (SMT) devices 314 and an antenna switch module (ASM) 312 can also be mounted on the packaging substrate 302. Although all of the various components are depicted as being laid out on the packaging substrate 302, it will be understood that some component(s) may be implemented over other component(s). In some embodiments, the components of the RF module 300 and one or more serial buses/interfaces (e.g., a RFFE bus/interface) used by the components of the RF module 300 may implement and/or perform one or more features as described herein.

In some implementations, a device and/or a circuit having one or more features described herein may be included in a device such as a wireless device. Such a device and/or a circuit may be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 9:
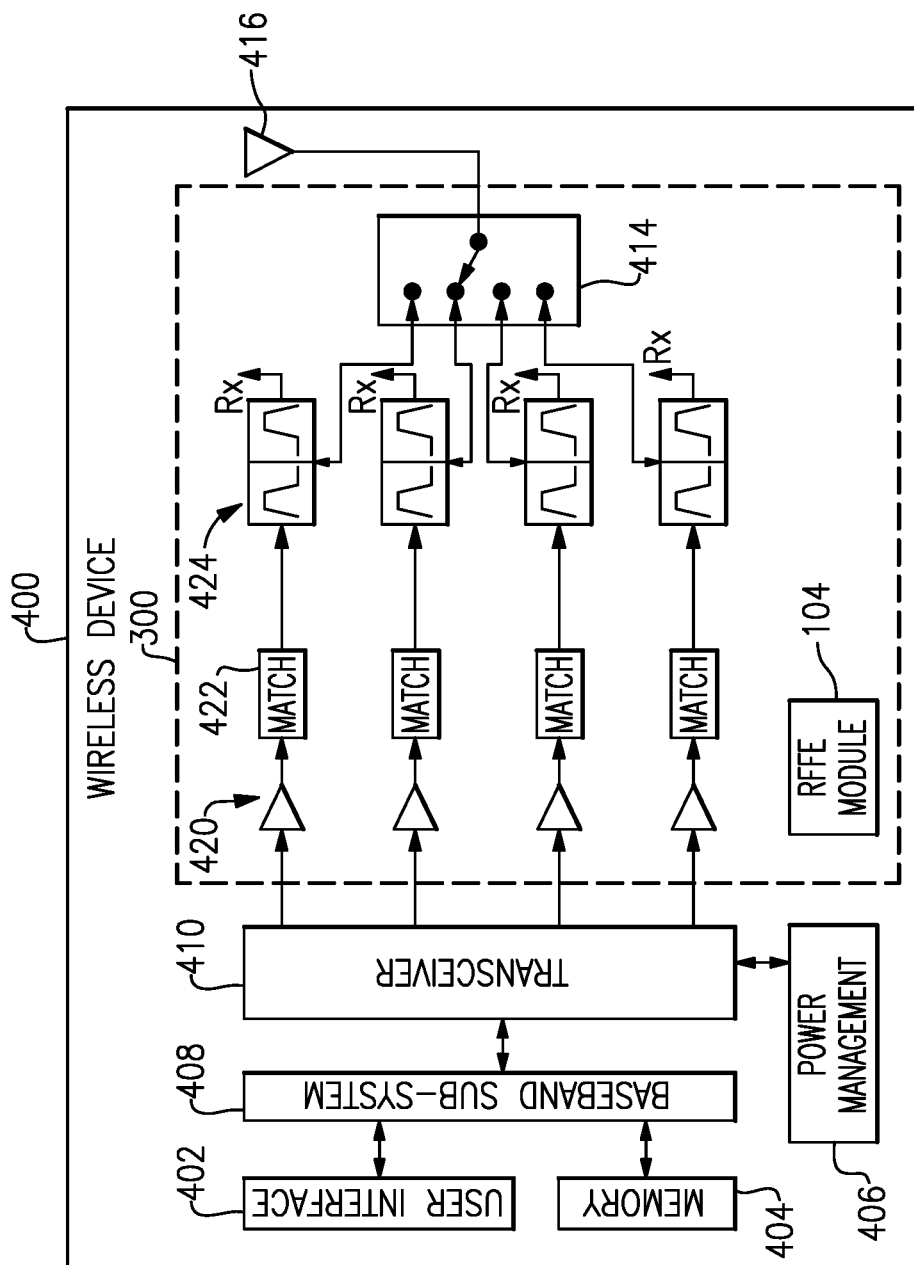
FIG. 9 is a diagram of an example wireless, according to some embodiments of the present disclosure.

FIG. 9 depicts an example wireless device 400 having one or more advantageous features described herein. In the context of a module having one or more features as described herein, such a module may be generally depicted by a RF module 300 (illustrated by the dashed box), and may be implemented as, for example, a front-end module (FEM). Such a module may include a RFFE module 104 having one or more features as described herein. The components of the RF module 300 and/or serial buses/interfaces of the RF module 300 may also have one or more features as described herein.

Referring to FIG. 9, power amplifiers (PAs) 420 can receive their respective RF signals from a transceiver 410 that may be configured and operated in known manners to generate RF signals to be amplified and transmitted, and to process received signals. The transceiver 410 is shown to interact with a baseband sub-system 408 that is configured to provide conversion between data and/or voice signals suitable for a user and RF signals suitable for the transceiver 410. The transceiver 410 can also be in communication with a power management component 406 that is configured to manage power for the operation of the wireless device 400. Such power management can also control operations of the baseband sub-system 408 and the RF module 300.

The baseband sub-system 408 is shown to be connected to a user interface 402 to facilitate various input and output of voice and/or data provided to and received from the user. The baseband sub-system 408 can also be connected to a memory 404 that is configured to store data and/or instructions to facilitate the operation of the wireless device, and/or to provide storage of information for the user.

In the example wireless device 400, outputs of the PAs 420 are shown to be matched (via respective match circuits 422) and routed to their respective duplexers 424. Such amplified and filtered signals may be routed to an antenna 416 through an antenna switch 414 for transmission. In some embodiments, the duplexers 424 can allow transmit and receive operations to be performed simultaneously using a common antenna (e.g., 416). In FIG. 9, received signals are shown to be routed to "Rx" paths (not shown) that can include, for example, a low-noise amplifier (LNA).

A number of other wireless device configurations can utilize one or more features described herein. For example, a wireless device does not need to be a multi-band device. In another example, a wireless device can include additional antennas such as diversity antenna, and additional connectivity features such as WiFi, Bluetooth, and GPS.

Figure 10:
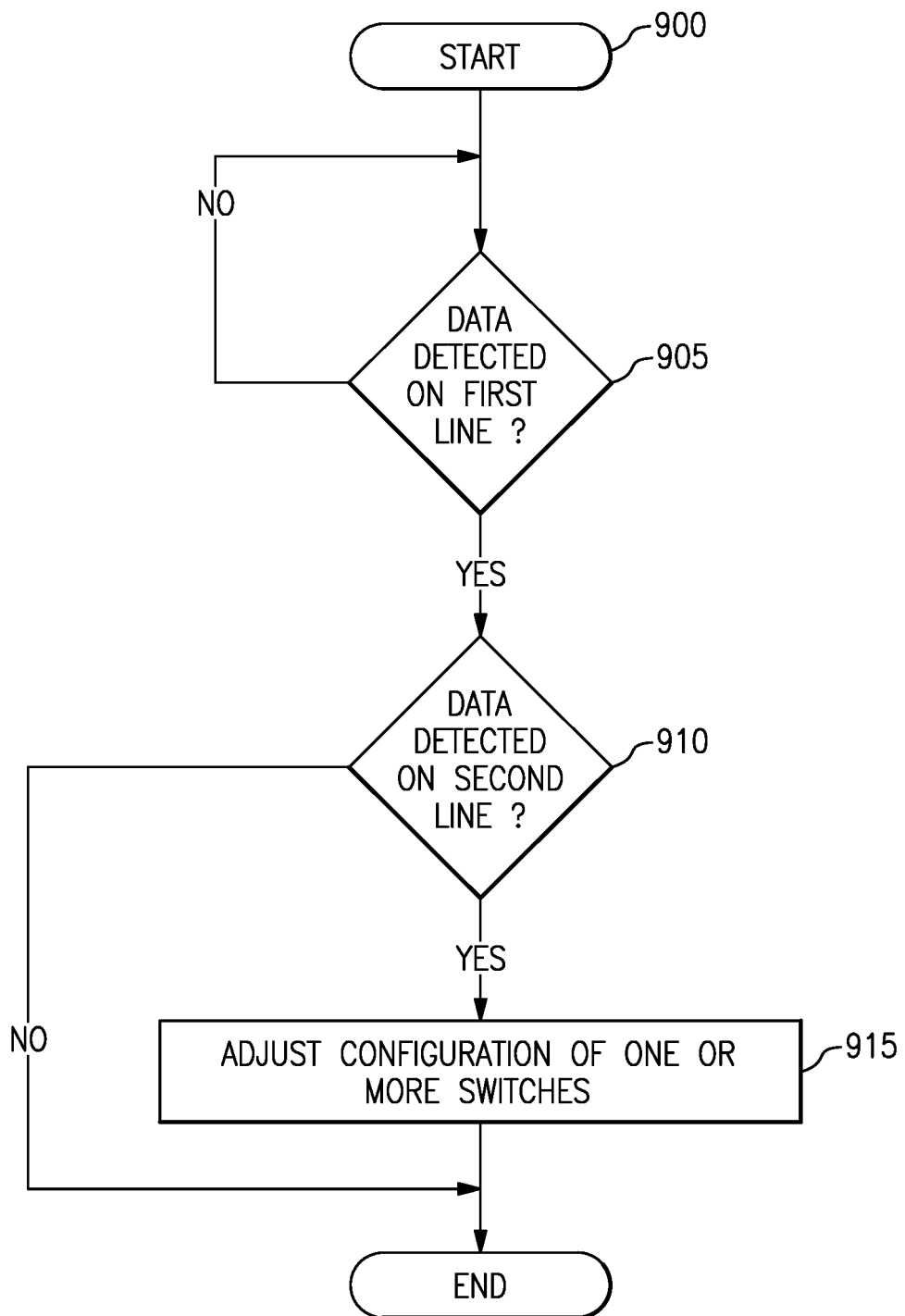
FIG. 10 is a flow diagram illustrating a process for configuration, coupling, and/or decoupling devices, circuits, and/or components of a module, according to some embodiments of the present disclosure.

FIG. 10 is a flow diagram illustrating a process 900 for configuring, coupling, and/or decoupling devices, circuits, and/or components of a module (e.g., a RF module), according to some embodiments of the present disclosure. The process 900 may be performed by processing logic that comprises hardware (e.g., circuitry, dedicated logic, programmable logic, microcode, etc.), software (e.g., instructions run on a processor to perform hardware simulation), or a combination thereof. In one embodiment, process 900 may be performed by an RF module and/or RF device, as illustrated in FIGS. 1, 2A, 2B, and 6. For example, the process 900 may be performed by the module 600 and/or the control component 650 illustrated in FIG. 7. In addition, the process 900 could alternatively be represented as a series of interrelated states via a state diagram or events.

The process 900 begins at block 905 where the process 900 determines whether data is detected and/or received on a first line (e.g., a first serial data line). For example, referring to FIGS. 2A, 2B, 4, and 5, the process 900 may determine whether first data is detected and/or received on the SDATA line. If data is not detected on the first line, the process 900 continues to block 905. If data is detected on the first line, the process 900 determines whether data is detected and/or received on a second line (e.g., a second serial data line). For example, referring to FIGS. 2A, 2B, 4 and 5, the process 900 may determine whether second data is detected and/or received on the SB_DATA line. If data is not detected on the second line, the process 900 ends. If data is detected on the second line, the process 900 proceeds to block 915 where the process 900 adjusts the configuration or one or more switches based on the data detected/received on the first line and the data detected/received on the second line. In one embodiment, the process 900 may adjust the positions of the one or more switches to coupled and/or decouple various components, devices, circuits, and/or modules, as discussed above. In another embodiment, the process 900 may also configure/reconfigure and/or change the operation of various components, devices, circuits, and/or modules at block 915, as discussed above. For example, the process 900 may change the biasing of one or more power amplifiers.

In one embodiment, the process 900 may adjust the configuration of one or more switches by identifying a register based on the data detected/received on the first line and/or the data detected/received on the second line, as discussed above. The process 900 may obtain state information from the identified register, as discussed above. The process 900 may adjust the configuration of one or more switches (and/or may adjust the configuration of one or more components, devices, circuits, and/or modules) based on the state information obtained from the identified register.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts may be performed as a single step and/or phase. Also, certain steps and/or phases may be broken into additional sub-components to be performed separately. In some instances, the order of the steps and/or phases may be rearranged and certain steps and/or phases may be omitted entirely. Also, the methods described herein are to be understood to be open-ended, such that additional steps and/or phases to those shown and described herein may also be performed.

Although various embodiments and examples are disclosed above, inventive subject matter extends beyond the specifically disclosed embodiments to other alternative embodiments and/or uses and to modifications and equivalents thereof. Thus, the scope of the claims that may arise from this disclosure is not limited by any of the particular embodiments described above. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Some aspects of the systems and methods described herein may advantageously be implemented using, for example, computer software, hardware, firmware, or any combination of computer software, hardware, and firmware. Computer software may comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that may be implemented using software to be executed on a general purpose computer may also be implemented using a different combination of hardware, software, or firmware. For example, such a module may be implemented completely in hardware using a combination of integrated circuits. Alternatively or additionally, such a feature or function may be implemented completely or partially using specialized computers designed to perform the particular functions described herein rather than by general purpose computers.

Multiple distributed computing devices may be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that may direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations. Furthermore, the terms "first," "second," "third," "fourth," etc., as used herein are meant as labels to distinguish among different elements and may not necessarily have an ordinal meaning according to their numerical designation.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein may be applied to other methods and systems, and are not limited to the methods and systems described above, and elements and acts of the various embodiments described above may be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An electronic device comprising:
   an antenna configured to transmit and receive signals; and
   a radio-frequency module including a serial bus including a clock line associated with a clock signal, a first serial data line associated with serial data, and a second serial data line associated with serial data, the radio-frequency module further including a control component coupled to the serial bus and a first switch, the control component configured to determine whether first data is detected on the first serial data line, determine whether second data is detected on the second serial data line, and decode a command based on the first data and the second data when the first data is detected on the first serial data line and when the second data is detected on the second serial data line, the first data and the second data each including a portion of the command, the control component further configured to decode the command based on the first data when the first data is detected on the first serial data line and when the second data is not detected on the second serial data line.

2. The electronic device of claim 1 wherein the control component is further configured to configure a first device based on the command.

3. The electronic device of claim 2 wherein the control component is configured to configure the first device by accessing a register based on the command, the register including state information for the first device.

4. The electronic device of claim 2 further comprising the first device.

5. The electronic device of claim 2 wherein the radio-frequency module is coupled to the first device via a third data line.

6. The electronic device of claim 1 wherein the command is in a first format when the first data is detected on the first serial data line and when the second data is detected on the second serial data line.

7. The electronic device of claim 6 wherein the command is in a second format when the first data is detected on the first serial data line and when the second data is not detected on the second serial data line.

8. The electronic device of claim 7 wherein the second format includes a radio-frequency front-end (RFFE) format.

9. An electronic device comprising:
   an antenna configured to transmit and receive signals; and
   a radio-frequency module including a serial bus including a clock line associated with a clock signal, a first serial data line associated with serial data, and a second serial data line associated with serial data, the radio-frequency module further including a control component coupled to the serial bus and a first switch, the control component configured to determine whether first data is detected on the first serial data line, determine whether second data is detected on the second serial data line, and decode a command based on the first data and the second data when the first data is detected on the first serial data line and when the second data is detected on the second serial data line, the first data and the second data separate from the clock signal, the first data including a first portion of the command and the second data including a second portion of the command, the first portion and the second portion of the command being in a first format.

10. The electronic device of claim 9 wherein the control component is further configured to decode the command based on the first data when the first data is detected on the first serial data line and when the second data is not detected on the second serial data line.

11. The electronic device of claim 9 wherein the control component is further configured to configure a first device based on the command.

12. The electronic device of claim 11 wherein the control component is configured to configure the first device by accessing a register based on the command, the register including state information for the first device.

13. The electronic device of claim 11 further comprising the first device.

14. The electronic device of claim 11 wherein the radio-frequency module is coupled to the first device via a third data line.

15. The electronic device of claim 9 wherein the command is in the first format when the first data is detected on the first serial data line and when the second data is detected on the second serial data line.

16. The electronic device of claim 10 wherein the command is in a second format when the first data is detected on the first serial data line and when the second data is not detected on the second serial data line.

17. The electronic device of claim 16 wherein the second format includes a radio-frequency front-end (RFFE) format.

18. An electronic device comprising:

an antenna configured to transmit and receive signals; and a radio-frequency module including a serial bus including a clock line associated with a clock signal, a first serial data line associated with serial data, and a second serial data line associated with serial data, the radio-frequency module further including a control component coupled to the serial bus and a first switch, the control component configured to determine whether first data is detected on the first serial data line, determine whether second data is detected on the second serial data line, the first data and the second data separate from the clock signal, and simultaneously process the first data and the second data to decode a command when the first data is detected on the first serial data line and when the second data is detected on the second serial data line, the simultaneous processing including discarding at least a portion of the first data received on the first serial data line.

19. The electronic device of claim 18 wherein the control component is further configured to decode a command based on the first data when the first data is detected on the first serial data line and when the second data is not detected on the second serial data line.

20. The electronic device of claim 18 wherein the control component is further configured to configure a first device based on the command.

* * * * *